US011290329B2

(12) United States Patent
Wackerly et al.

(10) Patent No.: US 11,290,329 B2
(45) Date of Patent: Mar. 29, 2022

(54) CONFIGURING A NETWORK BASED ON A CENTROID CONFIGURATION OF A GROUP OF NETWORK ENTITIES

(71) Applicant: HEWLETT PACKARD ENTERPRISE DEVELOPMENT LP, Houston, TX (US)

(72) Inventors: Shaun Wackerly, Lincoln, KY (US); Charles F. Clark, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/864,037

(22) Filed: Apr. 30, 2020

(65) Prior Publication Data
US 2021/0344562 A1   Nov. 4, 2021

(51) Int. Cl.
*H04L 12/24*   (2006.01)
*H04L 41/084*   (2022.01)
*H04L 41/0806*   (2022.01)

(52) U.S. Cl.
CPC ...... *H04L 41/0846* (2013.01); *H04L 41/0806* (2013.01)

(58) Field of Classification Search
CPC . H04L 67/42; H04L 41/0859; H04L 41/0846; H04L 41/0806; G06F 8/61
See application file for complete search history.

(56) References Cited

U.S. PATENT DOCUMENTS

| 9,935,854 | B2 | 4/2018 | Kuan et al. |
| 10,212,176 | B2 | 2/2019 | Wang |
| 10,728,119 | B2 * | 7/2020 | Parandehgheibi .... G06F 16/162 |
| 2014/0047544 | A1 * | 2/2014 | Jakobsson ............... G06F 21/55 726/23 |

(Continued)

FOREIGN PATENT DOCUMENTS

| CN | 108494746 A | 9/2018 |
| CN | 108683516 A | * 10/2018 |

OTHER PUBLICATIONS

Cohen et al., "Dante: A Framework for Mining and Monitoring Darknet Traffic", Mar. 5, 2020, 13 pages.

(Continued)

*Primary Examiner* — Christopher B Robinson
(74) *Attorney, Agent, or Firm* — Hewlett Packard Enterprise Patent Department

(57) ABSTRACT

Examples described herein configure a network based on a centroid configuration of a group of network entities. Examples herein include classifying a plurality of network entities into a classification, wherein the network entities are configured on a plurality of network devices that are connected to the network. Examples herein include, based on the classification of the network entities, grouping the network entities into a plurality of groups. Examples herein include determining, for each of the groups, a centroid configuration of the network entities in the group. Examples herein include sending instructions to configure the network according to the centroid configuration of a selected one of (Continued)

the groups, wherein at least one network entity is configured according to the centroid configuration of the selected group in response to receiving the instructions.

19 Claims, 6 Drawing Sheets

(56) References Cited

U.S. PATENT DOCUMENTS

| | | | |
|---|---|---|---|
| 2016/0378776 A1* | 12/2016 | Green | G06F 16/9537 |
| | | | 707/737 |
| 2017/0257309 A1* | 9/2017 | Appanna | H04L 12/4633 |
| 2018/0255084 A1 | 9/2018 | Kotinas et al. | |
| 2019/0095478 A1* | 3/2019 | Tankersley | G06F 16/2379 |
| 2020/0059482 A1* | 2/2020 | Zan | G06K 9/6223 |
| 2020/0382373 A1* | 12/2020 | Mermoud | H04L 41/0816 |

OTHER PUBLICATIONS

Haifengl, "Smile—Statistical Machine Intelligence and Learning Engine", available online at <https://web.archive.org/web/20191031175500/http://haifengl.github.io/smile/index.html>, Java SMILE library, Oct. 31, 2019, 5 pages.

Rhiannon Weaver, "Identifying Anomalous Port-Specific Network Behavior", Technical Report, Carnegie Mellon University, May 2010, 46 pages.

* cited by examiner

CONFIGURING A NETWORK BASED ON A CENTROID CONFIGURATION OF A GROUP OF NETWORK ENTITIES

BACKGROUND

Networks can include a plurality of resources connected by communication links, and can be used to connect people, provide services (e.g., internally and/or externally via the Internet and/or intranet), and/or organize information, among other activities associated with an entity. An example network can include a software-defined network (SDN).

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

Figure 1:
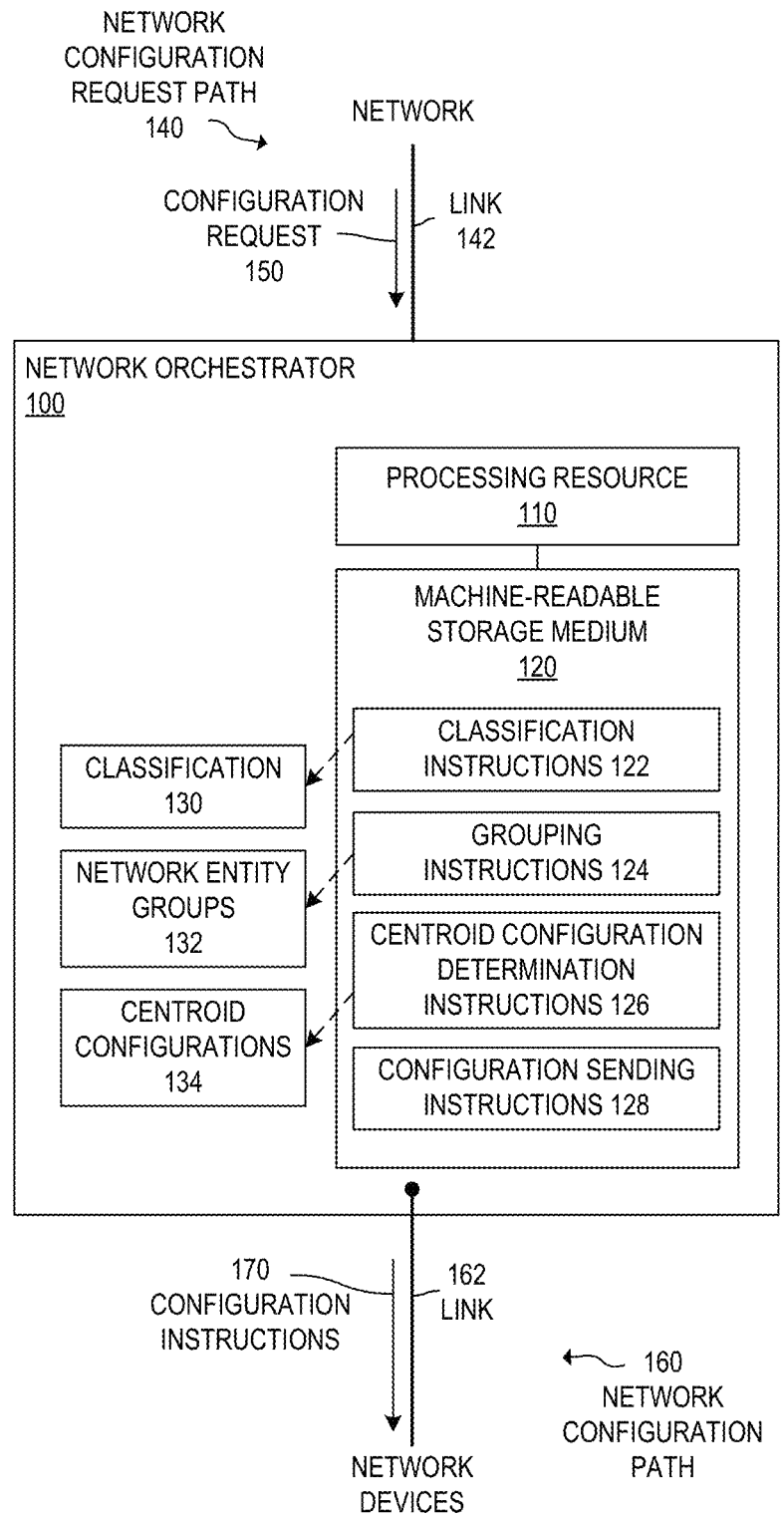
FIG. 1 is a block diagram of a network orchestrator 100 for configuring a network based on a centroid configuration of a group of network entities.

Large-scale networks, such as an enterprise networks, may comprise a plurality (e.g., hundreds of thousands) of network entities such as ports, link aggregation groups (LAGs), access control lists (ACLs), virtual local area networks (VLANs), etc., which are configured on a plurality (e.g., thousands) of network devices (e.g., switches). To manage these large-scale networks, network administrators may categorize network entities into groups having a standard set of configurations. Such categorization of network entities may be based on a variety of factors, such as locations or types (e.g., vendors, models, etc.) of network entities, types of network devices upon which network entities are configured, or a combination thereof.

However, due to the size and complexity of large-scale networks, static assignment of groups by network administrators can be a time-consuming process and can lead to human error. For instance, as the network devices in a group deviate from a standard configuration pattern, they become more difficult to manage and more likely to introduce a network issue (e.g., a network outage). Deviations may be introduced, for example, by incorrectly typed command line interface (CLI) commands, omission of a network device to a changeset, or by other network administrators who may be unaware of a standard configuration pattern. Thus, there is a need to determine standard configurations of network entities to allow for easier configuration of a network and to identify configuration deviations which can cause network issues.

To address these issues, examples described herein configure a network based on a centroid configuration of a group of network entities. Examples described herein may classify a plurality of network entities into a classification, wherein the network entities are configured on a plurality of network devices that are connected to the network, and based on the classification of the network entities, group the network entities into a plurality of groups. Examples described herein may determine, for each of the groups, a centroid configuration of the network entities in the group, and send instructions to configure the network according to the centroid configuration of a selected one of the groups, wherein at least one network entity is configured according to the centroid configuration of the selected group in response to receiving the instructions.

In this manner, examples described herein configure a network based on a centroid configuration of a group of network entities. For instance, examples described herein may group network entities into a plurality of groups, determine a centroid configuration of the network entities for each of the groups, and send instructions to configure the network according to the centroid configuration of a selected one of the groups, thereby allowing a network administrator to easily configure the network according to standard configurations of the network entities and to identify deviations (e.g., outlier configurations) from such standard configurations in the groups of network entities. Thus, examples described herein allow a network administrator to efficiently configure a network and to reduce network issues caused by deviations from standard configurations of network entities.

Referring now to the drawings, FIG. 1 is a block diagram of an example network orchestrator 100 for configuring a network based on a centroid configuration of a group of network entities. Network orchestrator 100 includes at least one processing resource 110 and at least one machine-readable storage medium 120 comprising (e.g., encoded with) at least classification instructions 122, grouping instructions 124, centroid configuration determination instructions 126, and configuration sending instructions 128 that are executable by the at least one processing resource 110 of network orchestrator 100 to implement functionalities described herein in relation to classification instructions 122, grouping instructions 124, centroid configuration determination instructions 126, and configuration sending instructions 128. In addition, network orchestrator 100 may engage in any network data transmission operations, including, but not limited to, switching, routing, bridging, or a combination thereof. Moreover, network orchestrator 100 may gather network operating information from various nodes of one or more networks, including network traffic load information, network topology information, network usage information, etc. Furthermore, network orchestrator 100 may transmit commands to various nodes of the one or more networks to alter network topology and routing to achieve various network efficiency and efficacy goals. It will be understood by one of ordinary skill in the art that network orchestrator 100 may comprise any suitable type(s) of computing device(s) for configuring a network based on a centroid configuration of a group of network entities. Moreover, network orchestrator 100 may include any necessary hardware components to perform the inventions disclosed herein, including, but not limited to: processors, memories, display devices, input devices, communications equipment, etc.

In the example of FIG. 1, network orchestrator 100 may comprise a controller. The controller may be configured (e.g., encoded with instructions executable by at least one processing resource 110) to manage a plurality of network devices (e.g., servers, switches, routers, access points, etc.) connected to a network. The controller may be an SDN controller. Moreover, the controller may comprise one or more cloud resources. It will be understood by one of ordinary skill in the art that network orchestrator 100 may comprise any suitable type(s) of controller(s) made by any suitable manufacturer(s).

In the example of FIG. 1, network orchestrator 100 may be configured (e.g., encoded with instructions executable by at least one processing resource 110) to receive a configuration request 150 via network configuration request path 140 to configure a network based on a centroid configuration of a group of network entities. Network configuration request path 140 may include any suitable communication link 142 (e.g., wired or wireless, direct or indirect, etc.) between network orchestrator 100 and a network. Configuration request 150 may include any suitable instructions to instruct network orchestrator 100 to configure a network (e.g., perform at least classification instructions 122, grouping instructions 124, centroid configuration determination instructions 126, and configuration sending instructions 128).

In examples described herein, a "network configuration request path" may include a combination of hardware (e.g., communications interfaces, communication links, etc.) and instructions (e.g., executable by a processing resource) to communicate (e.g., receive, send, etc.) a command (e.g., configuration request 150) with an external resource (server, cloud resource, etc.) connected to the network.

In the example of FIG. 1, classification instructions 122, when executed by processing resource 110, may classify a plurality of network entities into a classification. In examples described herein, a "network entity" refers to any entity that is configured (or configurable) on one or more network devices that are connected to a network. In addition, a network entity may comprise one or more physical entities such as ports and/or any other configured (or configurable) component(s) of a network device. Alternatively, a network entity may comprise one or more logical entities such as LAGs, ACLs, VLANs, policies, tunnels, routing protocols, virtual routers, etc. For instance, a network entity may comprise a port or LAG that is configured on one or more switches connected to a network. It will be understood by one skilled in the art that a network entity may be any suitable type(s) of physical or logical entities, now known or later developed, configured (or configurable) on one or more network devices connected to a network. Moreover, the classification of the network entities may be stored (as classification 130) in at least one machine-readable medium 120 of network orchestrator 100 or an external resource (e.g., server, cloud resource) that communicates with network orchestrator 100.

In the example of FIG. 1, classification instructions 122 may comprise instructions to determine device neighbor information of each of the network entities. In examples described herein, "device neighbor information" of a network entity refers to information (e.g., data) that identifies one or more network devices (e.g., switches, routers, WAPs, etc.) connected to a same network as the network entity. For instance, device neighbor information of a switch port may comprise data packets that identify other switches in the same LAN or VLAN as the switch port. In addition, device neighbor information of a network entity may be stored in network orchestrator 100 or an external resource (e.g., server, cloud resource, etc.) that communicates with network orchestrator 100 (e.g., via link 142). Furthermore, classification instructions 122 may comprise instructions to receive, from each of the network entities, data comprising device neighbor information of the network entity using a protocol such as Link Layer Discovery Protocol (LLDP), Cisco® Discovery Protocol (CDP), etc. It will be understood by one skill in the art that device neighbor information of each of the network entities may be determined using any suitable type(s) of protocols, now known or later developed.

In the example of FIG. 1, classification instructions 122 may comprise instruction to, based on (e.g., in response to) a determination that the device neighbor information of each of the network entities corresponds to known infrastructure devices, assign an "infrastructure" classification as the classification. In addition, classification instructions 122 may comprise instructions to, based on (e.g., in response to) a determination that the device neighbor information of each of the network entities does not correspond to known infrastructure devices, assign an "edge" classification as the classification. In examples described herein, a "known infrastructure device" refers to any type of network device (e.g., server, switch, router, WAP, etc.) which is predetermined to be an infrastructure-type device in a network. The known infrastructure devices may be predetermined, for instance, by a network administrator. Moreover, information (e.g., data) that identifies the known infrastructure devices may be stored in at least one machine-readable medium 120 of network orchestrator 100 and/or an external resource (e.g., server, cloud resource) that communicates with network orchestrator 100.

In the example of FIG. 1, grouping instructions 124, when executed by processing resource 110, may group the network entities into a plurality of groups. Grouping instructions 124 may be executed based on (e.g., in response to) the classification of the network entities according to classification instructions 122. In some examples, grouping instructions 124 may group the network entities differently depending on whether the network entities are assigned to an "infrastructure" classification or to an "edge" classification. Moreover, the plurality of groups may be stored (e.g., as network entity groups 132) in at least one machine-readable medium 120 of network orchestrator 100 and/or an external resource (e.g., server, cloud resource) that communicates with network orchestrator 100.

In the example of FIG. 1, grouping instructions 124 may comprise instructions to determine a plurality of configurations of each of the network entities. In examples described herein, a "configuration" of a network entity refers to any classification(s) or setting(s) associated with the network entity which may be used to group the network entity into one or more groups. For instance, configurations of an interface (e.g., port, LAG, etc.) may comprise one or more of the following: interface name(s), interface description(s), allowed VLANs on interface, native VLAN on interface, routing setting (e.g., on/off) of interface, routing protocols enabled on interface, routing instances used by interface, neighbor device information (e.g., LLDP data) of interface, ACLs applied to interface, other policies applied to interface, virtual routing and forwarding (VRF) association(s) of interface, interface number, interface speed, interface type, resident device(s), metadata associated with the interface (e.g., metadata stored internally on the network device, metadata stored on an external source from the network device), etc. In addition, configurations of a VLAN may comprise one or more of the following: port VLAN ID (PVID), native VLAN ID, trunk port configuration(s), access port configuration(s), ingress and/or egress rule(s), etc. Furthermore, configurations of an ACL may comprise one or more of the following: control traffic type (Layer 2, Layer 3, etc.), source and/or destination media access control (MAC) addresses, source and/or destination Internet protocol (IP) address(es), process traffic type (i.e., inbound or outbound traffic), etc. It will be understood by one skilled in the art that a configuration of a network entity may be any suitable characteristic or setting that is configured (or configurable) on the network entity.

In the example of FIG. 1, grouping instructions 124 to may comprise instructions to parse configuration data of the network entities into a platform agnostic model, and to determine the plurality of configurations of each of the network entities from the platform agnostic model. In examples described herein, a "platform agnostic model" refers to a data structure that can provide configuration data of network entities from various sources (e.g., different types of systems, devices, etc.) to network orchestrator 100. In some examples, the configuration data of the network entities may be parsed from one or more configuration texts received from one or more sources. Classification instructions 122 to parse configuration data of the network entities may be performed using any suitable network configuration tool (e.g., Batfish, a custom parser, etc.).

In the example of FIG. 1, grouping instructions 124 may comprise instructions to parse configuration data (e.g., from a configuration text) into a set of unique words and/or a list of words to determine a plurality of configurations of each of the network entities. In addition, grouping instructions may comprise instructions to remove certain characters (e.g., quotes, quotation marks, etc.) to parse the configuration data into the unique set of words and/or list of words. Alternatively, grouping instructions 124 may further comprise instructions to parse the configuration data into a plurality of configuration blocks. In examples described herein, a "configuration block" refers to a plurality of configurations (e.g., lines of configurations) that are associated with a network entity and/or a network device.

In the example of FIG. 1, grouping instructions 124 may comprise instructions to determine (e.g., compute), for each of the configurations, a matrix of individual metrics. Each individual metric may correspond to a relative metric or an absolute metric. In examples described herein, a "relative metric" refers to a value which corresponds to a distance (e.g., difference, similarity, etc.) between a configuration of two network entities (i.e., a distance between the configuration of one network entity and the same configuration of another network entity). For instance, relative metrics may include VLAN similarity (i.e., a comparison between VLANs associated with two interfaces), naming similarity (i.e., a comparison between interface names associated with two interfaces), IP similarity (i.e., a comparison between IP addresses associated with two interfaces), etc. In some examples, a relative metric may comprise a value (e.g., byte value) which corresponds to the distance (e.g., difference, similarity, etc.) between a configuration of two network entities. In examples described herein, an "absolute metric" refers to a value which corresponds to a configuration of a network entity that is independent of a distance (e.g., difference, similarity, etc.) with another network entity. For instance, an absolute metric may include routing (i.e., whether routing is on/off for an interface), interface enabled (i.e., whether an interface is enabled/disabled), neighbor device information (e.g., a type of network device that is in the same LAN or VLAN as an interface), number of VLANs configured (i.e., the number of VLANs that are associated with an interface), LAG membership (i.e., whether an interface is associated/unassociated with a LAG), etc. In some examples, an absolute metric may comprise a value (e.g., byte value) which corresponds to a configuration of a network entity. Moreover, the matrix of individual metrics may be stored in at least one machine-readable medium 120 of network orchestrator 100 or an external resource (e.g., server, cloud resource) that communicates with network orchestrator 100.

In the example of FIG. 1, grouping instructions 124 may comprise instructions to compare unique sets of words (e.g., parsed from one or more configuration texts) for two interfaces and return one or more values based on the similarity of the sets of unique words (e.g., number of unique words in common between the sets, number of unique words in the union of the sets, percentage of unique words in the set for one of the interfaces, etc.). In addition, grouping instructions 124 may comprise instructions to compare the lists of words (e.g., parsed from one or more configuration texts) for two interfaces and return one or more values based on the similarity of the lists of words (e.g., number of words in common between the lists, total number of words in the union of the lists, percentage of unique words in the list for one of the interfaces, etc.). In addition, grouping instructions 124 may comprise instructions to compare a plurality of configuration blocks (e.g., parsed from one or more configuration texts) and return one or more values based on the similarity of the configuration blocks (e.g., number of lines in common between the configuration blocks, number of lines in the union of the configuration blocks, percentage of unique lines in the configuration block for one of the interfaces, etc.). The one or more values based on the similarity of the sets of unique words, lists of words, and/or configuration blocks may be used to determine an individual metric between the interfaces.

In the example of FIG. 1, each matrix of individual metrics may comprise a plurality of individual metrics that are computed by one or more plug-ins (i.e., software modules). Each plug-in may comprise instructions stored on (e.g., encoded on) in at least one machine-readable medium 120 and executable by at least one processing resource 110 of network orchestrator 100. For instance, Table 1 below shows example plug-ins 180 and the configuration(s) received as input(s) for each plug-in.

TABLE 1

| Plug-ins 180 | Configuration(s) |
| --- | --- |
| Naming 181 | Interface name; interface description(s) |
| VLANs 182 | Allowed VLAN(s) on interface; native VLAN on interface |
| Routing 183 | Routing setting (on/off) of interface; routing protocol(s) enabled on interface; routing instance(s) used by interface |
| Neighbor 184 | Neighbor device information (e.g., LLDP data) of interface |
| ACLs & Policies 185 | ACL(s) applied to interface; other policy(s) applied to interface |
| IP Addressing 186 | List of IP address(es)/mask(s) configured on interface |
| VRF 187 | VRF association(s) on interface |
| Type & Location 188 | Interface number; interface speed; interface type; resident device(s) |

As shown in Table 1, Naming plug-in 181 is configured to receive an interface name and/or interface description(s) of each interface as configuration inputs. Moreover, Naming plug-in 181, when executed by processing resource 110, may parse the interface name/interface description(s) to determine similarity and hierarchy of the interface name/interface description(s) between two interfaces. In some examples, the interface name/interface description(s) may follow a hierarchical format comprising a plurality of hierarchical components, wherein each hierarchical component may be determined based on an order of an identifier in relation to other identifiers in the interface name/interface description(s), format(s) of the identifier(s), other characters (e.g., letters, numbers, special characters) between the identifiers, etc. For instance, port 3 of a switch located in building A may be assigned an interface name "s03-blgA", wherein the hyphen character "-" separates a switch port identifier ("s03") and a building identifier ("blgA") in the interface name. Alternatively, port 3 of a switch located in building A may be assigned an interface name "s03blgA", wherein the switch port identifier "s03" and building identifier "blgA" are distinguished by the pattern of alternating characters and numbers associated with each identifier. In addition, Naming plug-in 181 may further comprise instructions to compare hierarchical components of the interface name/interface description(s) of two interfaces to determine a similarity between the interface name/interface description(s) of the interfaces. For instance, for a port having an interface name "s03blgA", the hierarchical components "s", "03", "blg" and "A" may be compared with corresponding hierarchical components of an interface name of another port (e.g., "s04blgB", "w03blgA", etc.) to determine similarity between the interface names of the ports. In such example, a match of hierarchical components of a higher hierarchy may indicate greater similarity as compared to a match of hierarchical components of a lower hierarchy. For instance, network orchestrator 100 may determine that two interface names "s03blgA" and "s04blgB" (which have a matching component "s") have greater similarity than two interface names "s03blgA" and "w03blgA" (which have matching components "03", "blg", and "A"), wherein the "s" component has a higher hierarchy than the "03", "blg", and "A" components. Alternatively, when the interface name/interface description(s) does not follow a hierarchical format, Naming plug-in 181 may further comprise instructions to compare a data structure (e.g., text string) of each interface name/interface description(s) between two interfaces to determine a similarity between the interface name/interface description(s) of the interfaces.

Furthermore, Naming plug-in 181 may comprise instructions to compare sets of unique characters contained in two interface names and return one or more values (e.g., number of unique characters in common between the interface names, number of unique characters in the union of the interface names, percentage of different unique characters in one of the interface names, etc.) based on the similarity of characters contained in the sets of unique characters contained in the interface names. Alternatively, Naming plug-in 181 may comprise instructions to compare a list of characters contained in two interfaces names and return one or more values (e.g., number of characters in common between the interface names, number of characters in the union of the interface names, percentage of different characters in one of the interface names, etc.) based on the similarity of the lists of characters contained in the interface names.

As shown in Table 1, VLANs plug-in 182 is configured to receive allowed VLAN(s) on each interface and/or native VLAN on each interface as inputs. Moreover, VLANs plug-in 182, when executed by processing resource 110, may compare the set of VLANs (e.g., allowed VLANs, native VLAN) on two interfaces to determine a VLAN similarity between two interfaces. Comparing the set of VLANs on the interfaces may comprise identifying VLANs in common between the interfaces, VLANs that differ between the interfaces, a union of VLANs on the interfaces, etc. In examples described herein, an "allowed VLAN" on an interface refers to a VLAN that is tagged, such that traffic (e.g., data frames) sent or received via the interface includes a VLAN tag, whereas a "native VLAN" on an interface refers to a VLAN that is untagged, such that traffic sent or received via the interface does not include a VLAN tag. The VLAN similarity between two interfaces may be computed as a byte value according to Equation (1) below:

VLAN similarity=127−(255×number of VLANs that differ between the interfaces)/(union of VLANs on the interfaces), or 0 if no VLANs are configured on either of the interfaces.    Equation (1):

As shown in Table 1, Routing plug-in 183 is configured to receive routing setting (on/off) of each interface, routing protocol(s) enabled on each interface, and/or routing instance(s) used by each interface as inputs. In addition, Routing plug-in 183, when executed by processing resource 110, may compare the routing setting between two interfaces to determine a routing similarity between the interfaces (e.g., whether the routing setting is turned on for both interfaces). Furthermore, Routing plug-in 183 may comprise instructions to, based on (e.g., in response to) a determination that the routing setting is turned on for both interfaces, compare the routing protocols enabled on each of the interfaces and/or the routing instances used by each of the interfaces. Also, Routing plug-in 183 may comprise instructions to, based on (e.g., in response to) the comparison of the routing protocols enabled on each of the interfaces and/or the routing instances used by each of the interfaces, determine a routing similarity between the interfaces.

As shown in Table 1, Neighbor plug-in 184 receives neighbor device information (e.g., LLDP data) of each interface as input. Moreover, Neighbor plug-in 184, when executed by processing resource 110, may compare the neighbor device information between two interfaces to determine a neighbor similarity between the interfaces. Moreover, Neighbor plug-in 184 may further comprise instructions to, based on (e.g., in response to) a determination that neighbor device information is not available for either of the two interfaces, determine that the interfaces are dissimilar (e.g., the neighbor similarity is low).

As shown in Table 1, ACLs & Policies plug-in 185 is configured to receive ACL(s) applied to each interface and/or other policy(s) applied to each interface as inputs. Moreover, ACLs & Policies plug-in 185, when executed by processing resource 110, may compare the ACL(s) and/or policy(s) between two interfaces to determine ACL(s) and/or policy(s) similarity between the interfaces. ACLs & Policies plug-in 185 may compare name(s) and/or content of the ACL(s) and/or policy(s) applied to each interface to determine ACL(s) and/or policy(s) similarity between the interfaces. For instance, ACLs & Policies plug-in 185 may comprise instructions to parse the name(s) and/or content of the ACL(s) and/or policies to determine ACL(s) and/or policy(s) similarity between the interfaces.

In some examples, ACLs & Policies plug-in 185 may comprise instructions to compare the ACL(s) and/or policy(s) between two interfaces based on a relative ordering (e.g., ordering of entries of a configuration block) of the ACL(s) and/or policy(s) of each interface. To further illustrate such relative ordering of ACL(s) and/or policy(s), an example is provided with reference to First ACL 190 and Second ACL 191 shown in Table 2 below:

TABLE 2

| First ACL 190 | Second ACL 191 |
|---|---|
| 1: deny all http | 5: deny all http |
| 14: allow all https | 10: allow all https |
| 23: deny all ICMP | 15: deny all ICMP |
| 24: deny all IPv4 with source != 196.168* | 20: deny all IPv4 with source != 196.168* |
| 37: allow all others | 25: allow all others |

As shown in Table 2, First ACL 190 and Second ACL 191 each comprise a configuration block having a plurality of entries, and each First ACL 190 and Second ACL 191 use different ordering numbers for their respective entries. For instance, First ACL 190 uses ordering number "1" for its entry "deny all http", whereas the Second ACL uses ordering number "5" for its entry "deny all http". However, network orchestrator 100 may compare First ACL 190 and Second ACL 191 and determine that First ACL 190 and Second ACL 191 are similar based on relative ordering of their entries; each of the First and Second ACLs 190 and 191 have the entries "deny all http", "allow all https", "deny all ICMP", "deny all IPv4 with source !=196.168*", and "allow all others" which are arranged in the same order.

In some examples, ACLs & Policies plug-in 185 may comprise instructions compare the ACL(s) and/or policy(s) between two interfaces based on logical similarity between the ACL(s) and/or policy(s) of the interfaces. For instance, referring to Table 2 above, First ACL 190 has two entries "deny all ICMP" and "deny all IPv4 with source !=196.168*", both of which are "deny" entries and would have the same effect even if they were arranged in a swapped order in a configuration block (i.e., even if the "deny all IPv4 with source !=196.168*" entry was arranged before the "deny all ICMP" entry in the configuration block). Thus, network orchestrator 100 may compare First ACL 190 with another ACL which has entries "deny all ICMP" and "deny all IPv4 with source !=196.68*" in the swapped order and determine that ACL 190 is logically similar to that other ACL. In another example, ACLs & Policies plug-in 185 may comprise instructions to determine that two entries of different actions (e.g., "deny" versus "allow") have the same effect regardless of their order in a configuration block, based on a determination that the entries have non-overlapping match spaces. For instance, network orchestrator 100 may determine that one ACL having an entries "drop all IPv4" and "allow all LLDP" is logically similar to another ACL having the same entries in the swapped order, based on the determination that these entries do not have overlapping match spaces. It will be understood by one skilled in the art that ACLs & Policies plug-in 185 may comprise instructions to determine a logical similarity between any suitable type(s) of entries (e.g., lines of configuration blocks) of ACL(s) and/or policy(s).

In addition, The ACL(s) and/or policy(s) similarity between two interfaces may be a byte value computed as according to Equation (2) below:

ACL(s) and/or policy(s) similarity=127−(255× number of ACLs and/or policies that differ between the interfaces)/(union of ACL(s) and/or policy(s) on the interfaces), or 0 if no ACL(s) and/or policy(s) configured on either of the interfaces.     Equation (2):

As shown in Table 1, IP Addressing plug-in 186 is configured to receive a list of IP address(es)/mask(s) configured on each interface as inputs. Moreover, IP Addressing plug-in 186, when executed by processing resource 110, may parse the IP address(es)/mask(s) to determine similarity and hierarchy of the IP address(es)/mask(s) between two interfaces. IP Addressing plug-in 186 may further comprise instructions to compare hierarchical components (e.g., bits) of the IP address(es)/mask(s) of two interfaces to determine a similarity between the IP address(es)/mask(s) of the interfaces. For instance, network orchestrator 100 may determine that two IP addresses "172.16.1.0" and "172.16.254.1" (which have a matching second octets of "16") have greater similarity than two IP addresses "172.16.1.0" and "172.19.1.0" (which have matching third and fourth octets "1" and "0"), wherein the second octet of the IP addresses has a higher hierarchy than the third or fourth octets. Each IP address may use Internet Protocol version 4 (IPv4), Internet Protocol version 6 (IPv6), or any other suitable Internet protocol(s), now known or later developed.

As shown in Table 1, VRF plug-in 187 is configured to receive VRF association(s) on each interface as input. In addition, VRF plug-in 187, when executed by processing resource 110, may compare the VRF association(s) between two interfaces to determine a VRF similarity between the interfaces. For instance, VRF plug-in 187 comprises instructions to parse a data structure (e.g., text string) associated with names of VRF association(s) on each interface and compare the names of VRF association(s) between two interfaces to determine a VRF similarity between the interfaces.

As shown in Table 1, Type & Location plug-in 188 is configured to receive an interface number, interface speed, interface type, and or resident device(s) of each interface as inputs. In addition, Type & Location plug-in 188, when executed by processing resource 110, may compare an interface number, interface speed, interface type, and/or resident device(s) between two interfaces to determine a type & location similarity between the interfaces.

In the example of FIG. 1, grouping instructions 124 may determine (e.g., compute), for each of the configurations, a matrix of individual metrics, wherein each matrix of individual metrics is computed based on the determined similarity between the interfaces according to one or more of plug-ins 180.

In the example of FIG. 1, grouping instructions 124 may comprise instructions to determine (e.g., compute), for each of the configurations, a weighted matrix of individual metrics by applying a weight to the matrix of individual metrics. In addition, grouping instructions 124 may comprise instructions to determine (e.g., compute) a matrix of combined metrics by combining each of the weighted matrices of individual metrics into a single matrix. Moreover, each of the weighted matrices of individual metrics and the matrix of combined metrics may be stored in at least one machine-readable medium 120 of network orchestrator 100 or an external resource (e.g., server, cloud resource) that communicates with network orchestrator 100.

In the example of FIG. 1, grouping instructions 124 may comprise instructions to determine that a weight associated with a matrix of individual metrics has been modified (i.e., increased or decreased). In some examples, grouping instructions 124 to determine that the weight associated with the matrix of individual metrics has been modified may be based on (e.g., in response to) instructions received from an external device that communicates with network orchestrator 100. For instance, a network administrator may adjust a weight to be applied to a matrix of individual metrics using a computing device (e.g., laptop), and then the computing device may send (e.g., transmit) instructions to network orchestrator 100 to determine that the weight associated with the metric of individual metrics has been modified. In addition, grouping instructions 124 may comprise instructions to, based on (e.g., in response to) the determination that the weight has been modified, apply the modified weight to the matrix of individual metrics.

In the example of FIG. 1, grouping instructions 124 may comprise instructions to group the network entities into the plurality of groups by performing clustering on the matrix of combined metrics. In examples described herein, clustering may be performed on the matrix of combined metrics using various clustering techniques, including, but not limited to, hierarchical clustering (e.g., hierarchical agglomerative clustering), density-based clustering (e.g., density-based spatial clustering of applications with noise (DBSCAN)), distribution-based clustering (e.g., expectation maximization using Gaussian mixture modeling), centroid-based clustering (e.g., k-means clustering), or a combination thereof. It will be understood by one skill in the art that clustering may be performed on the matrix of combined metrics to group the network entities into groups using any suitable type(s) of clustering technique(s), now known and later developed. Grouping instructions 124 may group the network entities into a number of groups equal to a predetermined group formation threshold. The group formation threshold may be predetermined, for instance, by a network administrator.

In the example of FIG. 1, grouping instructions 124 may comprise instructions to determine an ordered set of regular expressions, wherein each of the regular expressions corresponds to a target group among a plurality of target groups. In examples herein, a "regular expression" refers to a data structure (e.g., text string) which may be used to search data and classify one or more devices (e.g., network devices) in a network. In some examples, a regular expression may comprise an LLDP regular expression which may be used to search LLDP data (e.g., LLDP data packets). In some examples, a regular expression may be used to search one or more configuration texts associated with the network entities and received from one or more sources. It will be understood by one skill in the art that the regular expressions may employ any suitable data structure(s), now known or later developed.

In examples herein, an "ordered set" of regular expressions refers to a plurality of regular expressions which are arranged in a predetermined manner. In some examples, the arrangement of the regular expressions in the ordered set may be predetermined by a network administrator. Moreover, the ordered set of regular expressions may be stored in at least one machine-readable medium 120 of network orchestrator 100 or an external resource (e.g., server, cloud resource) that communicates with network orchestrator 100.

In examples described herein, a "target group" may correspond to a plurality of devices (e.g., network devices) which are predetermined to correspond to (e.g., be in common with) with each other. For instance, a first target group may correspond to servers, and a second target group may correspond to WAPs. Further, in such example, the target group of servers may correspond to various types of servers (e.g., DHCP servers, DNS servers, etc.) and/or server models (e.g., HPE ProLiant® servers, HPE Apollo® servers, etc.) from various vendors/manufacturers. In some examples, a target group may be based on a function (e.g., core routers, aggregation layer, wiretap, etc.) that is associated with one or more network entities. It will be understood by one skilled in the art that each of the target groups may include to any suitable type(s) of devices and/or function(s) which may be associated with one or more network entities. Moreover, the target groups may be stored in at least one machine-readable medium 120 of network orchestrator 100 or an external resource (e.g., server, cloud resource) that communicates with network orchestrator 100.

In the example of FIG. 1, grouping instructions 124 may comprise instructions to assign, to each of the network entities, a highest ordered regular expression in the ordered set that matches a configuration (e.g., device neighbor information, interface name, etc.) of the network entity. The highest ordered regular expression in the ordered set that matches the configuration may be based on a predetermined mapping between the configurations of the network entities and the regular expressions in the ordered set. The mapping between the configurations and the regular expression in the ordered set may be predetermined, for instance, by a network administrator. Moreover, the mapping may be stored in at least one machine-readable medium 120 of network orchestrator 100 or an external resource (e.g., server, cloud resource) that communicates with network orchestrator 100.

In the example of FIG. 1, grouping instructions 124 may comprise instructions to group each of the network entities into a target group among the target groups which corresponds to the highest ordered regular expression assigned to the network entity. The target group which corresponds to the highest ordered expression assigned to the network entity may be determined based on a predetermined mapping between the regular expressions and the target groups. Moreover, the mapping may be predetermined by a network administrator, based on an expert system (e.g., a predetermined set of IF-THEN rules), etc. It will be understood by one skilled in the art that the predetermined mapping between the regular expressions and the target groups may be from any suitable source(s) or based on any suitable method(s). The mapping may be stored in at least one machine-readable medium 120 of network orchestrator 100 or an external resource (e.g., server, cloud resource) that communicates with network orchestrator 100.

In the example of FIG. 1, grouping instructions 124 may comprise instructions to determine that a group formation threshold has been modified (i.e., increased or decreased). In examples described herein, a "group formation threshold" is a value which indicates a total number of groups of network entities to be formed according to grouping instructions 124. In some examples, grouping instructions 124 to determine that a group formation threshold has been modified may be based on (e.g., in response to) instructions received from an external resource (e.g., computing device) that communicates with network orchestrator 100. For instance, a network administrator may adjust a group formation threshold using a computing device (e.g., laptop), and then the computing device may send (e.g., transmit) instructions to network orchestrator 100 to determine that the group formation threshold has been modified. In addition, grouping instructions 124 may comprise instructions to, based on (e.g., in response to) the determination that the group formation threshold has been modified, group the network entities into a number of groups equal to the group formation threshold.

In the example of FIG. 1, centroid configuration determination instructions 126, when executed by processing resource 110, may determine (e.g., compute), for each of the groups, a centroid configuration of the network entities in the group. In some examples, a "centroid configuration" of network entities in a group comprises a configuration of one of the network entities of the group that has a least cumulative distance (e.g., least cumulative difference) with configurations of every other one of the network entities of the group. In such examples, the centroid configuration may be determined automatically by network orchestrator 100.

Alternatively, a "centroid configuration" of network entities in a group comprises an average common configuration of the network entities in the group that is independent of (i.e., not necessarily equal to) a configuration of any one of the network entities in the group. In such examples, the centroid configuration may be determined automatically by network orchestrator 100. Alternatively, a "centroid configuration" comprises a predetermined configuration associated with the group of network entities. In such example, the "centroid configuration" may be predetermined (e.g., selected), for instance, by a network administrator. In addition, the plurality of centroid configurations may be stored (e.g., as centroid configurations 134) in at least one machine-readable medium 120 of network orchestrator 100 and/or an external resource (e.g., server, cloud resource) that communicates with network orchestrator 100. Determining the centroid configuration of the network entities in each of the groups may be based on (e.g., in response to) a determination that a weight associated with the selected group has been modified according to grouping instructions 124.

In the example of FIG. 1, centroid configuration determination instructions 126 may comprise instructions to determine a centroid configuration of the network entities of a group by excluding one or more configurations of one or more network entities in the group. For instance, network orchestrator 100 may exclude, from a computation of a centroid configuration of a group of network entities, one or more configuration of network entities in the group that are determined to have outlier configurations relative to the other network entities in the group.

In the example of FIG. 1, configuration sending instructions 128, when executed by processing resource 110, may send instructions to configure the network according to the centroid configuration of a selected one of the groups, wherein at least one network entity is configured according to the centroid configuration of the selected group in response to receiving the instructions.

In the example of FIG. 1, configuration sending instructions 128 may comprise instructions to determine that a configuration of a network entity deviates from the centroid configuration of the selected group. It may be determined that a network entity deviates from the centroid configuration (i.e., the network entity is an outlier of the selected group) when the distance (e.g., distance) between the configuration of the network entity and the centroid configuration exceeds a deviation threshold. Moreover, the deviation threshold may have a range proportional to a standard deviation of the centroid configuration of the group. For instance, the deviation threshold may have a range equal to twice the standard deviation of the centroid configuration of the group.

In the example of FIG. 1, configuration sending instructions 128 may comprise instructions to, based on (e.g., in response to) the determination that the configuration of the network entity deviates from the centroid configuration of the selected group, send instructions to change the configuration of the network entity to match the centroid configuration of the selected group. A configuration of a network entity may be considered to match the centroid configuration of a selected group when the configuration of the network entity is identical to the centroid configuration of the selected group. Alternatively, a configuration of a network entity may be considered to match the centroid configuration of a selected group when the configuration of the network entity is similar to (but not necessarily identical to) the centroid configuration of the selected group. In some examples, instructions to change the configuration the network entity to match the centroid configuration of the selected group may comprise instructions to add or remove configuration data (e.g., lines in a configuration block) such that the configuration is within the deviation threshold of the centroid configuration of the selected group.

In the example of FIG. 1, configuration sending instructions 128 may further comprise instructions to determine one or more identifiers associated with the centroid configuration of the selected group. An identifier may include one or more placeholders for information associated with one or more network entities. Moreover, configuration sending instructions 128 may comprise instructions to, based on (e.g., in response to) determining the one or more identifiers associated with the centroid configuration, send instructions to request information associated with the one or more network entities. In addition, configuration sending instructions 128 may comprise instructions to receive the requested information associated with the one or more network entities. Furthermore, configuration sending instructions 128 may comprise instructions to send instructions to configure the network according to the centroid configuration which includes the information associated with the one or more network entities. For instance, suppose network orchestrator 100 determines that a centroid configuration for a group of network entities is the configuration shown in Table 3 below:

TABLE 3

| |
|---|
| no shutdown |
| ip static <IP_ADDRESS>/24 |
| ip mtu <MTU> |

In such example, network orchestrator 100 determines that identifiers <IP_ADDRESS> and <MTU> of the centroid configuration are placeholder (identifiers) for the IP address and MTU information of an interface. Based on this determination, network orchestrator 100 sends instructions to an external source to request the IP address and MTU information of an interface that is to be configured according to the centroid configuration. Next, network orchestrator 100 receive the requested IP address and MTU information associated with the interface. Then, network orchestrator 100 sends instructions to configure the interface according to the centroid configuration of the group which include the IP address and MTU information of the interface.

In the example of FIG. 1, configuration sending instructions 128 may comprise instructions to determine that a new network entity is not in any of the groups, wherein the new network entity is configured on one or more of the network devices. In some examples, configuration sending instructions 128 may further comprise instructions to determine that a configuration of the new network entity most closely matches the centroid configuration of the selected group among the groups. In such examples, configuration sending instructions 128 may further comprise instructions to, based on (e.g., in response to) the determination that the configuration of the new network entity most closely matches the centroid configuration of the selected group among the groups, add the new network entity to the selected group. Alternatively, in some examples, configuration sending instructions 128 may further comprise instructions to assign, to the network entity, a highest ordered regular expression in the ordered set that matches a configuration of the network entity. In such examples, configuration sending instructions 128 may further comprise instructions to determine that the selected group corresponds to the highest ordered regular expression assigned to the new network entity. Moreover, in such examples, configuration sending instructions 128 may further comprise instructions to, based on (e.g., in response) to the determination that the selected group corresponds to the highest ordered regular expression assigned to the new network entity, add the new network entity to the selected group.

In the example of FIG. 1, configuration sending instructions 128 may comprise instructions to determine that a new network device is connected to the network. Moreover, configuration sending instructions 128 may comprise instructions to determine that a new network entity is not in any of the groups, wherein the new network entity is configured on the new network device. In some examples, configuration sending instructions 128 may further comprise instructions to determine that a configuration of the new network entity most closely matches the centroid configuration of the selected group among the groups. In such examples, configuration sending instructions 128 may further comprise instructions to, based on (e.g., in response to) the determination that the configuration of the new network entity is closest to the centroid configuration of the selected group, add the new network entity to the selected group. Alternatively, in some examples, configuration sending instructions 128 may further comprise instructions to assign, to the new network entity, a highest ordered regular expression in the ordered set that matches a configuration of the network entity. In such examples, configuration sending instructions 128 may further comprise instructions to determine that the selected group corresponds to the highest ordered regular expression assigned to the new network entity. Furthermore, in such examples, configuration sending instructions 128 may comprise instruction to, based on (e.g., in response to) the determination that the selected group corresponds to the highest ordered regular expression assigned to the new network entity, add the new network entity to the selected group.

In the example of FIG. 1, configuration sending instructions 128, when executed by processing resource 110, may send instructions to display (e.g., via a display device) configurations of the network entities of a selected one of the group of network entities. In some examples, the configuration sending instructions 128 may be configured to send instructions to display the configuration of the one or more network entities in the selected group of network entities to overlap each other. In this manner, the configurations of a selected group of the network entities may be visualized by a user (e.g., network administrator) and deviations between the configurations may be easily identified based on the overlapped configurations.

In the example of FIG. 1, network orchestrator 100 may be configured (e.g., encoded with instructions executable by at least one processing resource 110) to send (e.g., transmit) configuration instructions 170 via network configuration path 160 to configure the network based on a centroid configuration of a group of network entities. Network configuration path 160 may include any suitable communication link 162 (e.g., wired or wireless, direct or indirect, etc.) between network orchestrator 100 and a plurality of network devices (e.g., switches). Configuration instructions 170 may include any suitable instructions to configure a network (e.g., perform at least classification instructions 122, grouping instructions 124, centroid configuration determination instructions 126, and configuration sending instructions 128).

In examples described herein, a "network configuration path" may include a combination of hardware (e.g., communications interfaces, communication links, etc.) and instructions (e.g., executable by a processing resource) to communicate (e.g., receive, send, etc.) a command (e.g., configuration 170) to one or more network devices (e.g., switches) and network entities (e.g., ports, LAGs) configured on the one or more network devices.

In this manner, the example network orchestrator 100 of FIG. 1 may configure a network based on a centroid configuration of a group of network entities. For instance, network orchestrator 100 may group network entities into a plurality of groups, determine, for each of the groups, a centroid configuration of the network entities in the group, and send instructions to configure the network according to the centroid configuration of a selected one of the groups, thereby allowing a network administrator to configure the network according to standard configurations (i.e., centroid configurations) of the network entities and to identify deviations (i.e., outlier configurations) from such standard configurations in the group of network entities. Thus, the example network orchestrator 100 of FIG. 1 may allow a network administrator to efficiently configure a network and to reduce network issues caused by configuration deviations.

Figure 2:
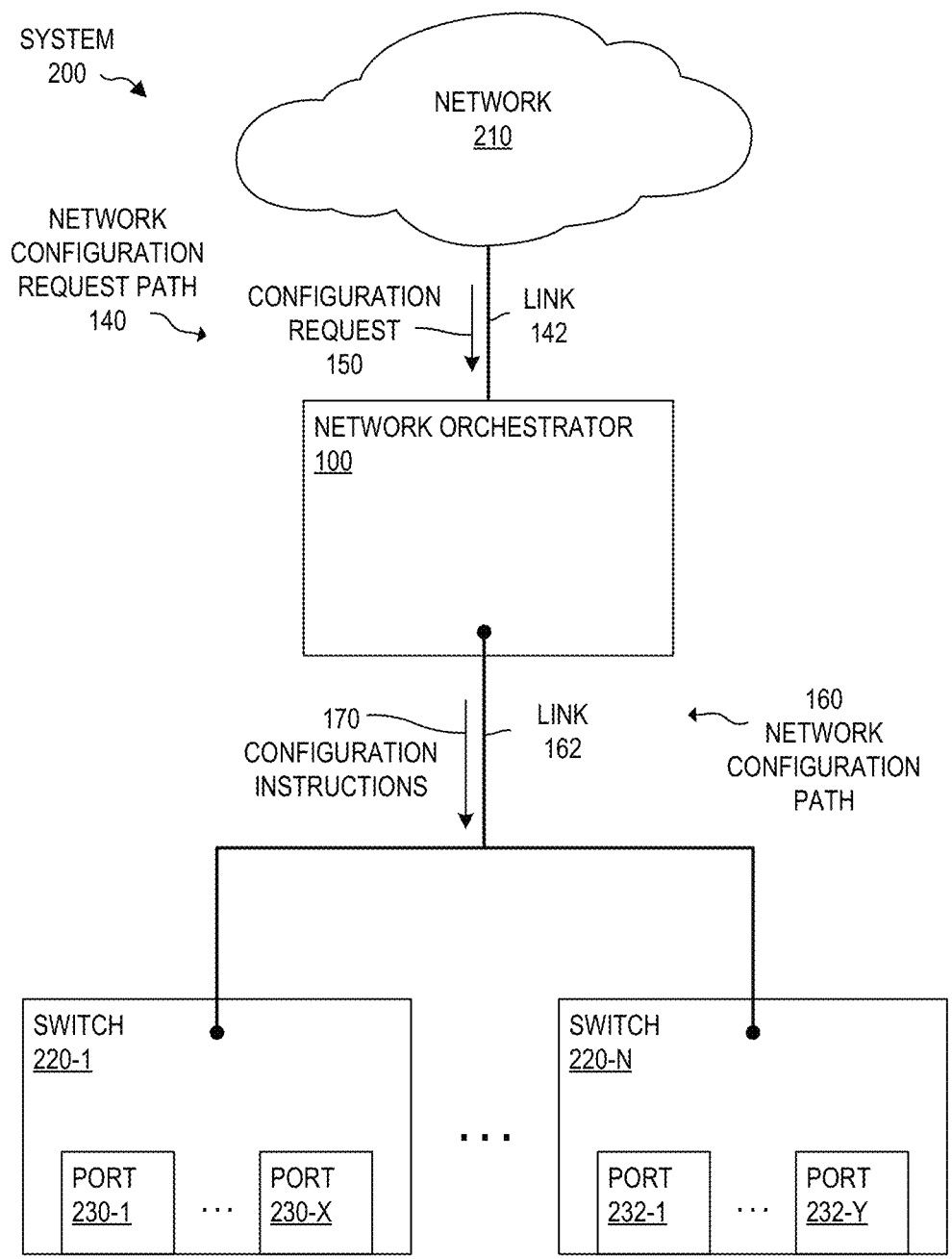
FIG. 2 is a block diagram of a system 200 for configuring a network based on a centroid configuration of a group of network entities.

FIG. 2 is a block diagram of an example system 200 for configuring a network based on a centroid configuration of a group of network entities. System 200 may include network orchestrator 100, as described above in relation to FIG. 1.

In the example of FIG. 2, system 200 may comprise a network 210, wherein network orchestrator 100 is connected to network 210. In some examples, network 210 is an SDN. Network 210 may comprise one or more local area networks (LANs), virtual LANs (VLANs), wireless local area networks (WLANs), virtual private networks (VPNs), wide area networks (WANs), the Internet, or the like, or a combination thereof. As used herein, a "wide area network" or "WAN" may comprise, for example, a wired WAN, wireless WAN, hybrid WAN, software-defined WAN (SD-WAN), or a combination thereof. Moreover, network 210 may comprise one or more cellular networks using one or more mobile communications standards (e.g., 3G, 4G, 5G, etc.). It will be understood by one skilled in the art that system 200 may comprise any suitable type(s) of network(s), now known or later developed.

In the example of FIG. 2, system 200 may comprise a plurality of switches 220-1 to 220-N connected to network orchestrator 100, wherein N is equal to the total number of switches connected to network orchestrator 100. Each of switches 220-1 to 220-N may comprise a managed switch (i.e., switches managed by network orchestrator 100) which supports data link layer switching (i.e., Layer 2 or L2 switching), IP layer routing (i.e., Layer 3 or L3 routing), or a combination thereof. Moreover, each of switches 220-1 to 222-N may comprise stackable or standalone type switches, power over Ethernet (PoE) or non-PoE type switches, modular or fixed configuration (i.e. fixed configuration Ethernet) type switches, etc. It will be understood by one skill in the art that each of switches 220-1 to 220-N may be any suitable type(s) of switches, now known or later developed.

In the example of FIG. 2, system 200 may comprise a plurality of ports that are configured on each of switches 220-1 to 220-N. For instance, as shown in FIG. 2, ports 230-1 to 230-X are configured on switch 220-1, and ports 232-1 to 232-Y are configured on switch 220-N, wherein X is equal to the total number of switches configured on switch 220-1, and wherein Y is the total number of switches configured on switch 220-N. Each of the ports of switches 220-1 to 220-N may be connected to any suitable type(s) of network devices (e.g., servers, controllers, routers, switches WAPs, etc.) or other suitable computing device(s).

In the example of FIG. 2, network orchestrator 100 receives a configuration request 150 via network configuration request path 140 to configure network 210 based on a centroid configuration of a group of network entities.

In the example of FIG. 2, network orchestrator 100 classifies each of the ports into a classification by determining device neighbor information of each of the ports. Network orchestrator 100 determines the device neighbor information of each of the ports by receiving, from each of the ports, LLDP data comprising device neighbor information of the network entity. For instance, Table 2 below shows a classification that is assigned to each the ports 230-1 to port 230-8 of switch 230-1 based on a type of neighbor device (switch, WAP, server) that is determined to be connected to the same LAN or VLAN as the port:

TABLE 4

| Port | Neighbor Device Type | Classification |
| --- | --- | --- |
| 230-1 | Switch | Infrastructure |
| 230-2 | Switch | Infrastructure |
| 230-3 | WAP | Edge |
| 230-4 | Server | Edge |
| 230-5 | Switch | Infrastructure |
| 230-6 | Server | Edge |
| 230-7 | Switch | Infrastructure |
| 230-8 | WAP | Edge |

As shown in Table 4, network orchestrator 100 assigns an "infrastructure" classification to ports 230-1, 230-2, 230-5, and 230-7 based on a determination that a neighbor device connected to each of these ports is a switch (in this example, switches are predetermined to be "known infrastructure devices" by a network administrator). Moreover, as shown in Table 4, network orchestrator 100 assigns an "edge" classification to ports 230-3, 230-4, 230-6, and 230-8 based on a determination that a neighbor device connected to each of these ports is not a switch (e.g., the neighbor device is a WAP or server) or is unknown. The classification of the ports may be stored as classification 130 in network orchestrator 100.

In the example of FIG. 2, network orchestrator 100 may group the ports into a plurality of groups, based on classification 130. For instance, as explained below, network orchestrator 100 may group "infrastructure" ports (e.g., ports 230-1, 230-2, 230-5, and 230-7) differently than "edge" ports (e.g., ports 230-3, 230-4, 230-6, and 230-8).

Grouping of "Infrastructure" Ports 230-1, 230-2, 230-5, and 230-7

In the example of FIG. 2, network orchestrator 100 may group ports classified as "infrastructure" ports. For instance, network orchestrator 100 may execute grouping instructions 124 (including VLAN plug-in 182 and Routing plug-in 183) to group "infrastructure" ports 230-1, 230-2, 230-5, and 230-7 based on VLAN similarity and routing similarity. First, network orchestrator 100 may determine a plurality of configurations of each of the ports 230-1, 230-2, 230-5, and 230-7. For instance, as shown in Table 5 below, network orchestrator 100 may determine allowed VLANs on each of ports 230-1, 230-2, 230-5, and 230-7 (e.g., by executing VLAN plug-in 182) and a routing setting (on/off) on each of ports 230-1, 230-2, 230-5, and 230-7 (e.g., by executing Routing plug-in 183):

TABLE 5

| Port | Allowed VLAN(s) | Routing setting (on/off) |
| --- | --- | --- |
| 230-1 | VLAN1; VLAN2; VLAN3 | On |
| 230-2 | VLAN1; VLAN4; VLAN5 | On |
| 230-5 | VLAN4; VLAN5 | Off |
| 230-7 | None | Off |

In the example of FIG. 2, network orchestrator 100 may compute, for each of the configurations of ports 230-1, 230-2, 230-5, and 230-7, a matrix of individual metrics. Network orchestrator 100 computes a first matrix of individual metrics by executing VLAN plug-in 182 and computes a second matrix of individual metrics by executing Routing plug-in 183. Network orchestrator 100 receives allowed VLAN(s) on each of the ports 230-1, 230-2, 230-5, and 230-7 as inputs for VLAN plug-in 182, and receives a routing setting on of each of ports 230-1, 230-2, 230-5, and 230-7 as inputs for Routing plug-in 183. In addition, for each pair of ports among ports 230-1, 230-2, 230-5, and 230-7, network orchestrator 100 compares the set of VLANs (allowed VLANs) on the ports to determines a VLAN similarity between the ports, as computed according to Equation (1): VLAN similarity=127−(255×number of different VLANs between interfaces)/(union of VLANs on the interfaces), or 0 if no VLANs are configured on either of the interfaces. Furthermore, for each pair of ports among ports 230-1, 230-2, 230-5, and 230-7, network orchestrator 100 compares the routing setting between the ports to determine whether the routing setting is turned on for both ports, and returns a byte value of 127 when both ports have the same routing setting or a value of −128 when the ports have different routing settings.

Table 6 below shows a matrix of individual metrics of VLAN similarity on each pair of ports 230-1, 230-2, 230-5, and 230-7, and Table 7 below shows a computed matrix of individual metrics of routing setting similarity for each pair of ports 230-1, 230-2, 230-5, and 230-7:

TABLE 6

| Port | 230-1 | 230-2 | 230-5 | 230-7 |
| --- | --- | --- | --- | --- |
| 230-1 | 127 | −77 | −128 | −128 |
| 230-2 | −77 | 127 | 42 | −128 |
| 230-5 | −128 | 42 | 127 | −128 |
| 230-7 | −128 | −128 | −128 | 127 |

TABLE 7

| Port | 230-1 | 230-2 | 230-5 | 230-7 |
| --- | --- | --- | --- | --- |
| 230-1 | 127 | 127 | −128 | −128 |
| 230-2 | 127 | 127 | −128 | −128 |
| 230-5 | −128 | −128 | 127 | 127 |
| 230-7 | −128 | −128 | 127 | 127 |

As shown in Table 6 above, each of the individual metrics of VLAN similarity is computed according to Equation (1). For instance, to determine the VLAN similarity of allowed VLANs between port 230-1 and port 230-2, network orchestrator 100 determines that there are four different VLANs between ports 230-1 and 230-2 (VLAN2, VLAN3, VLAN4, VLAN5) and union of five VLANs on the ports 230-1 and 230-1 (VLAN1, VLAN2, VLAN3, VLAN4, VLAN5). Network orchestrator 100 determines VLAN similarity between ports 230-1 and 230-2 according to Equation (1) as 127−(255×4/5)=−77.

In the example of FIG. 2, network orchestrator 100 may compute, for each of the configurations of ports 230-1, 230-2, 230-5, and 230-7, a weighted matrix of individual metrics by applying a weight to the matrix of individual metrics. As shown in Table 8 below, a first weighted matrix of individual metrics is determined by applying a weight of 0.75 to the matrix of allowed VLANs on ports 230-1, 230-2, 230-5, and 230-7. Furthermore, as shown in Table 9 below, a second weighted matrix of individual metrics is determined by applying a weight of 0.25 to the matrix of routing settings on ports 230-1, 230-2, 230-5, and 230-7:

TABLE 8

| Port  | 230-1  | 230-2  | 230-5 | 230-7 |
|-------|--------|--------|-------|-------|
| 230-1 | 95.25  | −57.75 | −96   | −96   |
| 230-2 | −57.75 | 95.25  | 31.5  | −96   |
| 230-5 | −96    | 31.5   | 95.25 | −96   |
| 230-7 | −96    | −96    | −96   | 95.25 |

TABLE 9

| Port  | 230-1 | 230-2 | 230-5 | 230-7 |
|-------|-------|-------|-------|-------|
| 230-1 | 31.75 | 31.75 | −32   | −32   |
| 230-2 | 31.75 | 31.75 | −32   | −32   |
| 230-5 | −32   | −32   | 31.75 | 31.75 |
| 230-7 | −32   | −32   | 31.75 | 31.75 |

In the example of FIG. 2, network orchestrator 100 may compute a matrix of combined metrics by combining each of the weighted matrices of individual metrics into a single matrix. The weighted matrices of individual metrics are combined into a single matrix by taking the sum of the individual metrics for each corresponding row and column of the weighted matrices. As shown in Table 10 below, a matrix of combined metrics is formed by combining the weighted matrix of allowed VLANs and the weighted matrix of routing settings into a single matrix:

TABLE 10

| Port  | 230-1 | 230-2 | 230-5  | 230-7  |
|-------|-------|-------|--------|--------|
| 230-1 | 127   | −26   | −128   | −128   |
| 230-2 | −26   | 127   | −0.5   | −128   |
| 230-5 | −128  | −0.5  | 127    | −64.25 |
| 230-7 | −128  | −128  | −64.25 | 127    |

In the example of FIG. 2, network orchestrator 100 may group ports 230-1, 230-2, 230-5, and 230-7 into a plurality of groups by performing hierarchical clustering on the matrix of combined metrics. Moreover, the number of groups to be formed by network orchestrator 100 may be equal to a group formation threshold which is predetermined by a network administrator. For instance, for a group formation threshold of three groups, port 230-1 may be grouped into a first group, ports 230-2 and 230-5 may be grouped into a second group, and port 230-7 may be grouped into a third group (based on a determination that ports 230-2 and 230-5 are the most similar pairs of ports among ports 230-1, 230-2, 230-5, and 230-7). Moreover, for a group formation threshold of two groups, ports 230-1, 230-2, and 230-5 may be grouped into a first group, and port 230-7 may be grouped into a second group (based on a determination that port 230-1 is more similar to ports 230-2 and 230-5 than port 230-7).

Grouping of "Edge" Ports 230-3, 230-4, 230-6, and 230-8

In the example of FIG. 2, network orchestrator 100 may group "edge" ports 230-3, 230-4, 230-6, and 230-8 as follows. First, network orchestrator 100 may determine an ordered set of regular expressions, wherein each of the regular expressions corresponds to a target group among a plurality of target groups. Table 11 below shows an example ordered set of LLDP regular expressions and corresponding target groups:

TABLE 11

| Classifier Order | Name | LLDP Regular Expression | LLDP Field | Target Group |
|---|---|---|---|---|
| 1 | Aruba ® Controllers | Aruba.*72\d\d | System Description | Controllers |
| 2 | Aruba ® 200-series WAPs | Aruba AP-20\d | System Description | APs |
| 3 | Printers | print | System Name | Printers |
| 4 | DHCP Server | dhcp | System Name | Servers |
| 5 | DNS Server | dns | System Name | Servers |
| 6 | Legacy Printers | 192.168.1.10.* | Management Addr | Printers |

In the example of FIG. 2, network orchestrator 100 may assign, to each of ports 230-3, 230-4, 230-6, and 230-8, a highest ordered regular expression in the ordered set that matches a configuration (e.g., device neighbor information) of the port. Furthermore, network orchestrator 100 may group each of ports 230-3, 230-4, 230-6, and 230-8 into a target group among the target groups which corresponds to the highest ordered regular expression assigned to the network entity. For instance, as shown in Table 12 below, each of ports 230-3, 230-4, 230-6, and 230-8, are assigned a highest ordered regular expression from the ordered set shown in Table 11 and mapped to a corresponding target group:

TABLE 12

| Port | Neighbor Device | Highest ordered LLDP Regular Expression | Target Group |
|---|---|---|---|
| 230-3 | Aruba ® AP-205 | Aruba AP-20\d | WAPs |
| 230-4 | HPE ® ProLiant ML30 Server | dhcp | Servers |
| 230-6 | HPE ® Apollo 2000 Server | dns | Servers |
| 230-8 | Aruba ® AP-204 | Aruba AP-20\d | WAPs |

In the example of FIG. 2, network orchestrator 100 may compute, for each of the groups of ports, a centroid configuration of the network entities in the group. For instance, for the above-described group of "infrastructure" ports 230-1, 230-2, 230-5, and 230-7, network orchestrator 100 may determine the configuration of port 230-2 (allowed VLANs=VLAN1, VLAN4, and VLAN5; routing setting=on) to be the centroid configuration for the group, based on a determination that the configuration of port 230-2 has the least cumulative distance with configurations of every other one of ports 230-1, 230-5, and 230-7 of the group.

In the example of FIG. 2, network orchestrator 100 may send instructions to configure the network according to the centroid configuration of a selected one of the groups, wherein at least one network entity is configured according to the centroid configuration of the selected group in response to receiving the instructions. For instance, for the above-described group of "infrastructure" ports 230-1, 230-

2, 230-5, and 230-7, network orchestrator 100 may determine that the configuration of port 230-1 deviates from the centroid configuration of the group of ports beyond a deviation threshold. Furthermore, network orchestrator 100 may, based on the determination that the configuration of the port 230-1 deviates from the centroid configuration of the group beyond the deviation threshold, send instructions to change the configuration of port 230-1 to match the centroid configuration of the group (i.e., the configuration of port 230-2).

In the example of FIG. 2, network orchestrator 100 may send a configuration instruction 170 via network configuration path 160 to configure network 210 based on a centroid configuration of a group of network entities. For instance, for the above-described group of "infrastructure" ports 230-1, 230-2, 230-5, and 230-7, network orchestrator 100 may send configuration instruction 170 via network configuration path 160 to change the configuration of port 230-7 to match the centroid configuration of the group (the configuration of port 230-1).

In this manner, the example system 200 of FIG. 2 may configure network 210 based on a centroid configuration of a group of ports. For instance, network orchestrator 100 may group "infrastructure" ports 230-1, 230-2, 230-5, and 230-7 into a group, determine the centroid configuration of ports 230-1, 230-2, 230-5, and 230-7 in the group, and configure network 210 according to the centroid configuration of the group, thereby allowing a network administrator to configure network 210 according to standard configurations of the ports and to easily identify deviations from such standard configurations in the groups of network entities. Thus, the example system 200 of FIG. 2 may allow a network administrator to efficiently configure network 210 and to reduce network issues caused by configuration deviations.

Figure 3:
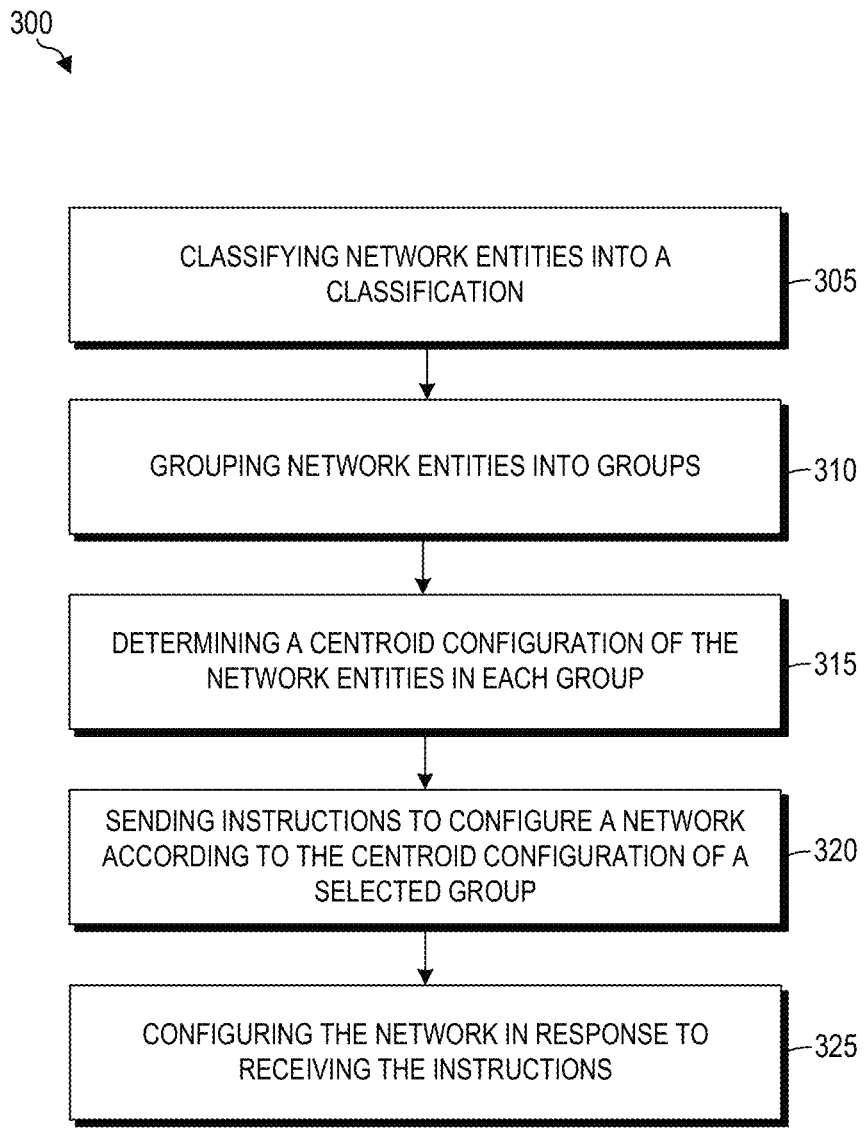
FIG. 3 shows an example functionality 300 for configuring a network based on a centroid configuration of a group of network entities.

FIG. 3 shows an example functionality 300 for configuring a network based on a centroid configuration of a group of network entities. Functionality 300 may be implemented as a method or may be executed as one or more instructions on a machine (e.g., by at least one processor), where the one or more instructions are included on at least one machine-readable storage medium (e.g., a non-transitory machine readable-storage medium.) While only five blocks are shown in functionality 300, functionality 300 may include other actions described herein. Additionally, although the blocks are shown in an order, blocks depicted in FIG. 3 may be performed in any order and at any time. Also, some of the blocks shown in functionality 300 may be omitted without departing from the spirit and scope of this disclosure. Functionality 300 may be implemented on a network orchestrator according to any of the examples herein.

As shown in block 305, functionality 300 may include classifying a plurality of network entities into a classification. Moreover, at block 305, functionality 300 may include determining device neighbor information of each of the network entities. Determining device neighbor information of each of the network entities may comprise receiving, from each of the network entities, LLDP data comprising device neighbor information of the network entity. Also, at block 305, functionality 300 may include, based on (e.g., in response to) determining that the device neighbor information of each of the network entities corresponds to known infrastructure devices, assigning an "infrastructure" classification as the classification. Furthermore, at block 305, functionality 300 may include, based on (e.g., in response to) determining that the device neighbor information of each of the network entities does not correspond to known infrastructure devices, assigning an "edge" classification as the classification.

As shown in block 310, functionality 300 may include grouping the network entities into a plurality of groups. Grouping the network entities into the plurality of groups may be based on (e.g., in response to) classifying the network entities (at block 305). In addition, at block 310, functionality 300 may include determining that a group formation threshold has been modified (i.e., increased or decreased). Moreover, at block 310, functionality 300 may include, based on (e.g., in response to) the determining that the group formation threshold has been modified, grouping the network entities into a number of groups equal to the group formation threshold.

As shown in block 315, functionality 300 may include determining a centroid configuration of the network entities in each group. Determining the centroid configuration of the network entities in each of the groups may be based on (e.g., in response to) determining that a weight to be applied to a matrix of individual metrics has been modified (e.g., increased or decreased). In some examples, determining the centroid configuration of network entities in a group comprises determining a configuration of one of the network entities of the group that has a least cumulative distance (e.g., least cumulative difference) with configurations of every other one of the network entities of the group. Alternatively, determining a centroid configuration of network entities in a group comprises determining an average common configuration of the network entities in the group that is independent of (i.e., not necessarily equal to) a configuration of any one of the network entities in the group. In some examples, the centroid configuration may be determined automatically by a processing resource (e.g., network orchestrator). Alternatively, determining a centroid configuration of network entities in a group comprises receiving a predetermined configuration associated with the group of network entities. Furthermore, at block 315, functionality 300 may include determining a centroid configuration of the network entities of a group by excluding one or more configurations of one or more network entities in the group.

In the example of FIG. 3, at block 315, functionality 300 may include determining one or more identifiers associated with the centroid configuration of the selected group. Moreover, configuration sending instructions 128 may comprise instructions to, based on (e.g., in response to) determining the one or more identifiers associated with the centroid configuration, sending instructions to request information associated with the one or more network entities.

As shown in block 320, functionality 300 may include sending instructions to configure a network according to the centroid configuration of a selected group. In addition, at block 320, functionality 300 may include determining that a configuration of a network entity deviates from the centroid configuration of the selected group. Moreover, at block 320, functionality 300 may include, based on (e.g., in response to) determining that the configuration of the network entity deviates from the configuration of the centroid group, sending instructions to change the configuration of the network entity to match the centroid configuration of the selected group. Further, at block 320, functionality 300 may include determining that a new network entity is not in any of the groups, wherein the new network entity is configured on one or more of the network devices. In one example, at block 320, functionality 300 may include determining that a configuration of the new network entity most closely matches the centroid configuration of the selected group among the groups. In such example, functionality 300 may further include, based on (e.g., in response to) determining that the configuration of the new network entity most closely matches the centroid configuration of the selected group among the groups, adding the new network entity to the selected group. In another example, at block 320, functionality 300 may include assigning, to the network entity, a highest ordered regular expression in an ordered set that matches a configuration of the network entity. In such example, functionality 300 may further include determining that the selected group corresponds to the highest ordered regular expression assigned to the new network entity. Furthermore, in such example, functionality 300 may further include, based on (e.g., in response) to determining that the selected group corresponds to the highest ordered regular expression assigned to the new network entity, adding the new network entity to the selected group.

At block 320, functionality 300 may include sending instructions to display (e.g., via a display device) configurations of the network entities of a selected one of the group of network entities. Moreover, at block 320, functionality 300 may include sending instructions to display the configuration of the one or more network entities in the selected group of network entities such that the displayed configurations overlap each other.

In the example of FIG. 3, at block 320, functionality 300 may include detecting a new network device that is connected to the network. Moreover, at block 320, functionality 300 may include detecting a new network entity that is not in any of the groups, wherein the new network entity is configured on the new network device. In one example, at block 320, functionality 300 may further include determining that a configuration of the new network entity most closely matches the centroid configuration of the selected group among the groups. In addition, in such example, functionality 300 may further include, based on (e.g., in response to) determining that the configuration of the new network entity is closest to the centroid configuration of the selected group, adding the new network entity to the selected group. In another example, at block 320, functionality may further include assigning, to the network entity, a highest ordered regular expression in an ordered set that matches a configuration of the network entity. In such example, functionality 300 may further include determining that the selected group corresponds to the highest ordered regular expression assigned to the new network entity. In addition, in such example, functionality 300 may further include, based on (e.g., in response to) determining that the selected group corresponds to the highest ordered regular expression assigned to the new network entity, adding the new network entity to the selected group.

In the example of FIG. 3, at block 325, functionality 300 may include configuring the network in response to receiving the instructions to configure the network according to the centroid configuration of the selected group. Configuring the network may include changing a configuration of a network entity in the selected group to match the centroid configuration of the selected group. In some examples, changing the configuration the network entity to match the centroid configuration of the selected group may comprise adding and/or removing configuration data (e.g., lines in a configuration block) such that the configuration is within the deviation threshold of the centroid configuration of the selected group. In addition, configuring the network may include adding a network entity into the selected group based on a determination that the configuration of the network entity most closely matches the centroid configuration of the selected group among the groups. Moreover, configuring the network may include adding a new network device to the network and configuring a network entity configured on the new network device to have the centroid configuration of the selected group. Furthermore, configuring the network may include adding a new network device to the network and adding a network entity configured on the network device into the selected group based on a determination that the configuration of the network entity most closely matches the centroid configuration of the selected group among the groups.

In this manner, example functionality 300 of FIG. 3 may configure a network based on a centroid configuration of a group of network entities. For instance, functionality 300 may include grouping network entities into a plurality of groups (at block 310), determining a centroid configuration of the network entities in each group (at block 315), sending instructions to configure the network according to the centroid configuration of a selected group (at block 320), and configuring the network in response to receiving the instructions (at block 325), thereby allowing a network administrator to easily configure the network according to standard configurations of the network entities and to identify deviations from such standard configurations in the group of network entities. Thus, example functionality 300 of FIG. 3 allows a network administrator to efficiently configure a network and to reduce network issues caused by deviations from standard configurations.

Figure 4:
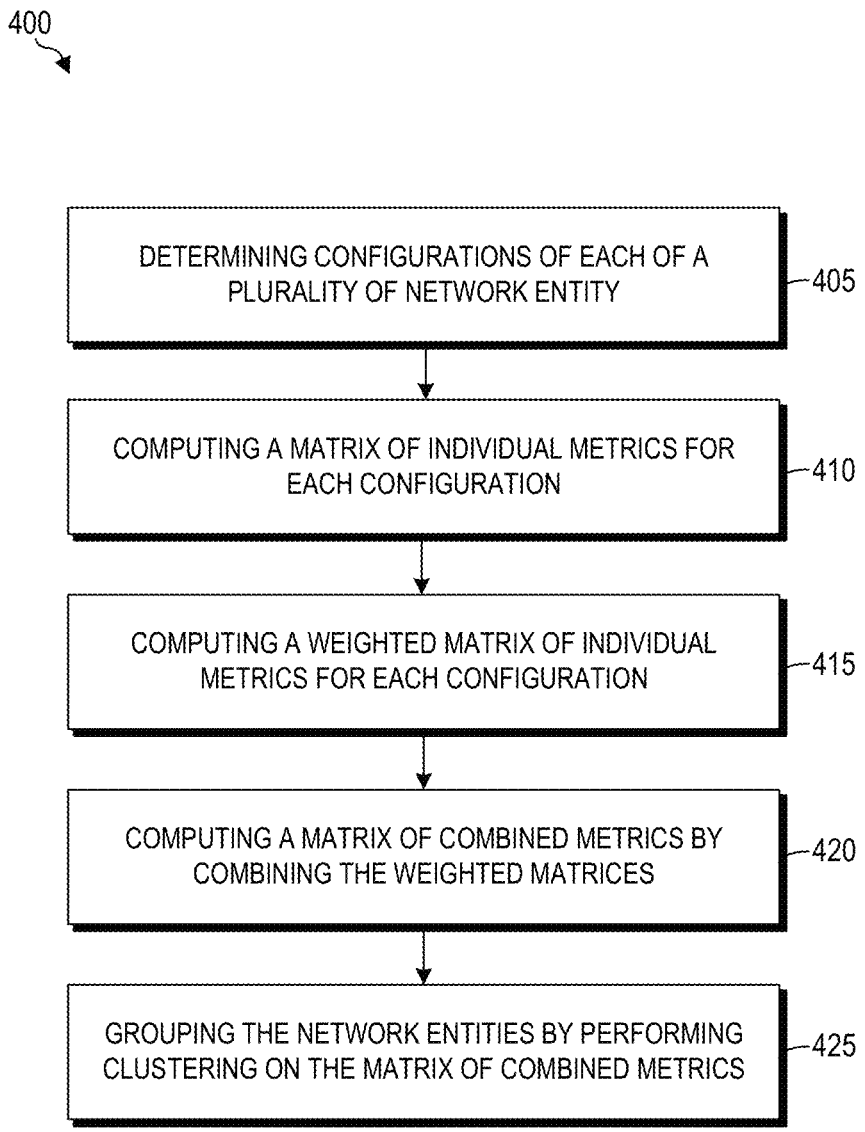
FIG. 4 shows an example functionality 400 for grouping network entities into a plurality of groups.

FIG. 4 shows an example functionality 400 for grouping network entities into a plurality of groups. Functionality 400 may be implemented as a method or may be executed as one or more instructions on a machine (e.g., by at least one processor), where the one or more instructions are included on at least one machine-readable storage medium (e.g., a non-transitory machine readable-storage medium.) While only five blocks are shown in functionality 400, functionality 400 may include other actions described herein. Additionally, although the blocks are shown in an order, blocks depicted in FIG. 4, may be performed in any order and at any time. Also, some of the blocks shown in functionality 400 may be omitted without departing from the spirit and scope of this disclosure. One or more actions of functionality 400 may be performed during block 310 of functionality 300 of grouping the network entities into a plurality of groups. Functionality 400 may be implemented on a network orchestrator according to any of the examples herein.

As shown in block 405, functionality 400 may include determining configurations of each of a plurality of network entities. At block 405, functionality 400 may include parsing configuration data of the network entities into a platform agnostic model, and to determining the plurality of configurations of each of the network entities from the platform agnostic model. In addition, at block 405, functionality 400 may include parsing configuration data (e.g., from a configuration text) into a set of unique words and/or a list of words to determine a plurality of configurations of each of the network entities. Furthermore, at block 405, functionality 400 may include removing certain characters (e.g., quotes, punctuation marks, etc.) to parse the configuration data into the unique set of words and/or list of words. Alternatively, at block 405, functionality 400 may include parsing the configuration data into a plurality of configuration blocks.

As shown in block 410, functionality 400 may include computing a matrix of individual metrics for each configuration. At block 410, functionality 410 may include storing the matrices of individual metrics into a storage medium.

In addition, at block 410, functionality 400 may include comparing sets of unique words and/or lists of words (e.g., parsed from one or more configuration texts) for two network entities and returning one or more values based on the similarity of the sets of unique words and/or lists of words of the network entities. Alternatively, at block 410, functionality 400 may include comparing a plurality of configuration blocks (e.g., parsed from one or more configuration texts) for two network entities and returning one or more values based on the similarity of the configuration blocks of the network entities. Moreover, at block 410, functionality 400 may include, based on the similarity of the sets of unique words, lists of words, and/or configuration blocks, determining an individual metric between the network entities.

In an example, at block 410, functionality 400 may include receiving an interface name and/or interface description(s) of each interface as configuration inputs. In addition, at block 410, functionality 400 may include parsing the interface name/interface description(s) to determine similarity and hierarchy of the interface name/interface description(s) between two interfaces. Furthermore, at block 410, functionality 400 may include comparing hierarchical components of the interface name/interface description(s) of two interfaces to determine a similarity between the interface name/interface description(s) of the interfaces, or comparing a string similarity between the interface name/interface description(s) of two interfaces to determine a similarity between the interface name/interface description(s) of the interfaces.

In another example, at block 410, functionality 400 may include receiving allowed VLAN(s) on each interface and/or native VLAN on each interface as inputs. In addition, at block 410, functionality 400 may include comparing the set of VLANs on two interfaces to identify VLANs in common between the interfaces, VLANs that differ between the interfaces, and/or a union of VLANs on the interfaces. In addition, at block 410, functionality may include, based on (e.g., in response to) comparing the set of VLANs on the two interfaces, determining a VLAN similarity between two interfaces.

In yet another example, at block 410, functionality 400 may include receiving a routing setting (on/off) of each interface, routing protocol(s) enabled on each interface, and/or routing instance(s) used by each interface as inputs. In addition, at block 410, functionality 400 may include comparing the routing setting between two interfaces. Moreover, at block 410, functionality may include, based on (e.g., in response to) comparing the routing setting between the interfaces, determining whether the routing setting is turned on for both interfaces. Furthermore, at block 410, functionality 400 may include, based on (e.g., in response to) determining that the routing setting is turned on for both interfaces, comparing the routing protocols enabled on each of the two interfaces and/or the routing instances used by each of the two interfaces. Also, at block 410, functionality 400 may include, based on (e.g., in response to) comparing the routing protocols enabled on each of the interfaces and/or the routing instances used by each of the interfaces, determining a routing similarity between the two interfaces.

In yet another example, at block 410, functionality 400 may include receiving neighbor device information (e.g., LLDP data) of each interface as input. In addition, at block 410, functionality 400 may include comparing the neighbor device information between two interfaces to determine a neighbor similarity between the two interfaces. Moreover, at block 410, functionality 400 may include, based on (e.g., in response to) a determination that neighbor device information is not available for either of the two interfaces, determining that two interfaces are dissimilar (e.g., the similarity between neighbors of the interfaces is low).

In yet another example, at block 410, functionality 400 may include receiving ACL(s) applied to each interface and/or other policy(s) applied to each interface as inputs. In addition, at block 410, functionality 400 may include comparing the ACLs (e.g., names of ACLs, content of ACLs) and/or policies between two interfaces to determine ACL(s) and/or policy(s) similarity between the interfaces. Moreover, at block 410, functionality 400 may include comparing the ACL(s) and/or policy(s) between two interfaces based on a relative ordering of entries (i.e., lines of the configuration block) in the ACL(s) and/or policy(s) of each interface. Furthermore, at block 410, functionality 400 may include comparing the ACL(s) and/or policy(s) between two interfaces based on logical similarity between the ACL(s) and/or policy(s) of the interfaces.

In yet another example, at block 410, functionality 400 may include receiving a list of IP address(es)/mask(s) configured on each interface as inputs. In addition, at block 410, functionality 400 may include parsing the IP addresses/masks to determine similarity and hierarchy of the IP addresses/masks between two interfaces. Moreover, at block 410, functionality 400 may include comparing hierarchical components (e.g. bits) of the IP addresses/masks of two interfaces to determine a similarity between the interface name/interface description(s) of the interfaces.

In yet another example, at block 410, functionality 400 may include receiving a VRF association(s) on each interface as input. In addition, at block 410, functionality 400 may include comparing the VRF association(s) between two interfaces to determine a VRF similarity between the interfaces. Moreover, at block 410, functionality 400 may include parsing a data structure (e.g., text string) associated with names of VRF(s) on each interface and comparing the names of VRF(s) between two interfaces to determine the VRF similarity between the interfaces.

In yet another example, at block 410, functionality 400 may include receiving an interface number, interface speed, interface type, and/or resident device(s) of each interface as inputs. In addition, at block 410, functionality 400 may include comparing an interface number, interface speed, interface type, and/or resident device(s) between two interfaces to determine a similarity between the interfaces.

As shown in block 415, functionality 400 may include computing a weighted matrix of individual metrics for each configuration. At block 415, functionality 410 may include storing the weighted matrices of individual metrics into a storage medium.

As shown in block 420, functionality 400 may include computing a matrix of combined metrics by combining the weighted matrices of individual metrics. At block 420, functionality 420 may include storing the matrix of combined metrics into a storage medium.

As shown in block 425, functionality 400 may include grouping the network entities into a plurality of groups by performing clustering on the matrix of combined metrics. At block 425, functionality 425 may include storing the groups into a storage medium.

Figure 5:
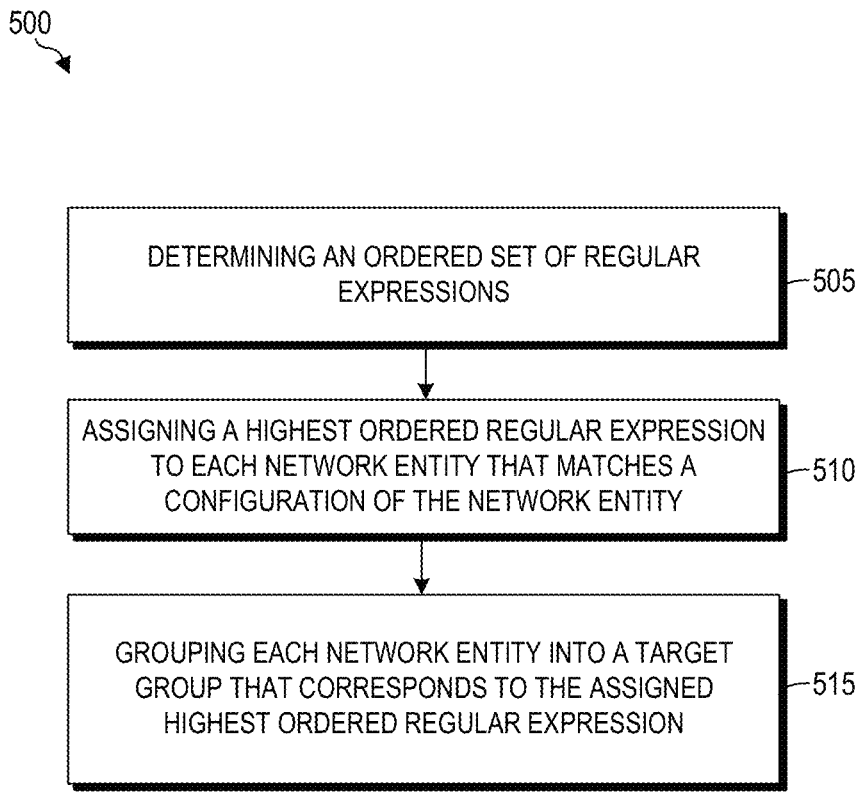
FIG. 5 shows an example functionality 500 for grouping network entities into a plurality of groups.

FIG. 5 shows an example functionality 500 for grouping network entities into a plurality of groups. Functionality 500 may be implemented as a method or may be executed as one or more instructions on a machine (e.g., by at least one processor), where the one or more instructions are included on at least one machine-readable storage medium (e.g., a non-transitory machine readable-storage medium.) While only three blocks are shown in functionality 500, functionality 500 may include other actions described herein. Additionally, although the blocks are shown in an order, blocks depicted in FIG. 5, may be performed in any order and at any time. Also, some of the blocks shown in functionality 500 may be omitted without departing from the spirit and scope of this disclosure. One or more actions of functionality 500 may be performed during block 310 of functionality 300 of grouping the network entities into a plurality of groups. Functionality 500 may be implemented on a network orchestrator according to any of the examples herein.

As shown in block 505, functionality 500 may include determining an ordered set of regular expressions. At block 505, functionality 500 may including the ordered set of regular expressions into a storage medium.

As shown in block 510, functionality 500 may include assigning a highest ordered regular expression to each network entity that matches a configuration of the network entity. At block 510, functionality 500 may including the storing the assigned highest ordered regular expression for each of the network entities into a storage medium.

As shown in block 515, functionality 500 may include grouping each network entity into a target group that corresponds to the assigned highest ordered regular expression to the network entity. At block 515, functionality 500 may including storing the target groups corresponding to each of the network entities into a storage medium.

Figure 6:
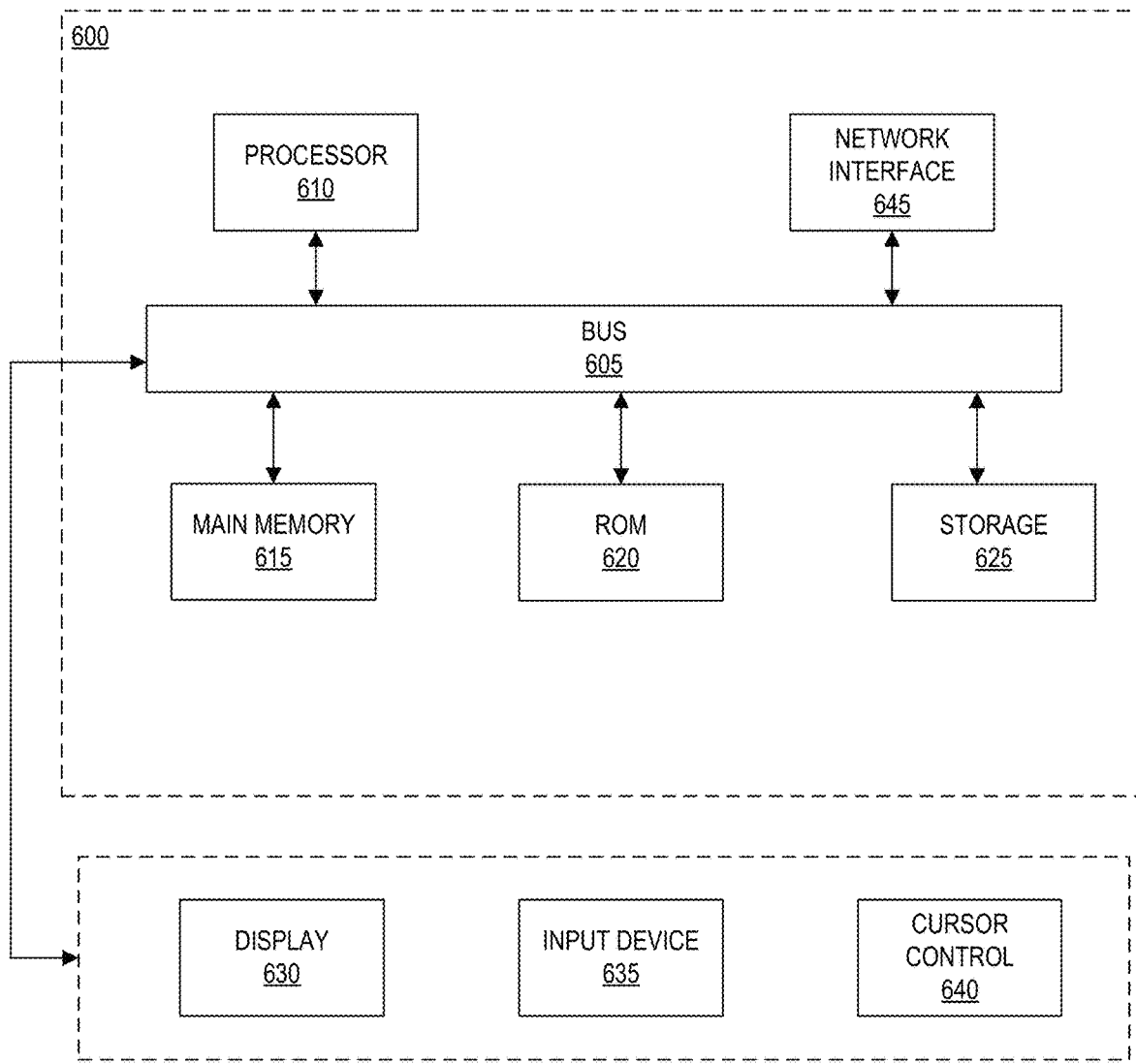
FIG. 6 is a block diagram of an example computer system 600 in which various embodiments described herein may be implemented for configuring a network based on a centroid configuration for a group of network entities.

FIG. 6 is a block diagram of an example computer system 600 in which various embodiments described herein may be implemented for configuring a network based on a centroid configuration of a group of network entities.

Computer system 600 includes bus 605 or other communication mechanism for communicating information, at least one hardware processor 610 coupled with bus 605 for processing information. At least one hardware processor 610 may be, for example, at least one general purpose microprocessor.

Computer system 600 also includes main memory 615, such as random access memory (RAM), cache, other dynamic storage devices, or the like, or a combination thereof, coupled to bus 605 for storing information and one or more instructions to be executed by at least one processor 610. Main memory 615 also may be used for storing temporary variables or other intermediate information during execution of one or more instructions to be executed by at least one processor 610. Such one or more instructions, when stored on storage media accessible to at least one processor 610, render computer system 600 into a special-purpose machine that is customized to perform the operations specified in the one or more instructions. Such one or more instructions may comprise at least classification instructions, grouping instructions, centroid configuration determination instructions, and configuration instructions according to any of the examples herein.

Computer system 600 may further include read only memory (ROM) 620 or other static storage device coupled to bus 605 for storing static of one or more instructions to be executed by at least one processor 610. Such one or more instructions, when stored on storage media accessible to at least one processor 610, render computer system 600 into a special-purpose machine that is customized to perform the operations specified in the one or more instructions.

Computer system 600 may further include information and one or more instructions for at least one processor 610. At least one storage device 625, such as a magnetic disk, optical disk, or USB thumb drive (Flash drive), or the like, or a combination thereof, may be provided and coupled to bus 605 for storing information and one or more instructions.

Computer system 600 may further include display 630 coupled to bus 605 for displaying a graphical output to a user. The computer system 600 may further include input device 635, such as a keyboard, camera, microphone, or the like, or a combination thereof, coupled to bus 605 for providing an input from a user. Computer system 600 may further include cursor control 640, such as a mouse, pointer, stylus, or the like, or a combination thereof, coupled to bus 605 for providing an input from a user.

Computer system 600 may further includes at least one network interface 645, such as a network interface controller (NIC), network adapter, or the like, or a combination thereof, coupled to bus 605 for connecting computer system 600 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked based on (e.g., in response to) detected events or interrupts. Software components configured for execution on computing devices may be provided on a computer readable medium, such as a compact disc, digital video disc, flash drive, magnetic disc, or any other tangible medium, or as a digital download (and may be originally stored on a compressed or installable format that requires installation, decompression or decryption prior to execution.) Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 based on (e.g., in response to) at least one processor 610 executing one or more sequences of one or more instructions contained in main memory 615. Such one or more instructions may be read into main memory 615 from another storage medium, such as at least one storage device 625. Execution of the sequences of one or more instructions contained in main memory 615 causes at least one processor 610 to perform the process steps described herein. In alternative embodiments, hard-wired circuitry may be used in place of or in combination with software instructions.

In examples described herein, a "wireless access point" or "WAP" generally refers to receiving points for any known or convenient wireless access technology which may later become known. Specifically, the term WAP is not intended to be limited to WAPs which conform to IEEE 802.11 standards. A WAP generally functions as an electronic device that is adapted to allow wireless devices to connect to a wired network via various communications standards. A WAP may include any necessary hardware components to perform the inventions disclosed herein, including, but not limited to: processors, memories, display devices, input devices, communications equipment, etc. It will be understood by one of ordinary skill in the art that network orchestrator 100 may comprise any suitable type(s) of WAP(s) made by any suitable manufacturer(s).

In examples described herein, a "computing device" may be a server, storage device, storage array, desktop or laptop computer, switch, router, gateway, controller, access point, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 1, storage medium 120 may be implemented by one machine-readable storage medium, or multiple machine-readable storage media.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard disk drive (HDD)), a solid state drive, any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

In other examples, the functionalities described above in relation to instructions described herein may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A method for configuring a network, comprising:
    classifying, by a processing resource, a plurality of network entities into a classification, wherein the network entities are configured on a plurality of network devices that are connected to the network;
    based on the classification of the network entities, grouping, by the processing resource, the network entities into a plurality of groups;
    determining, by the processing resource for each of the groups, a centroid configuration of the network entities in the group; and
    sending, by the processing resource, instructions to configure the network according to the centroid configuration of a selected one of the groups, wherein at least one network entity is configured according to the centroid configuration of the selected group in response to receiving the instructions;
wherein sending the instructions to configure the network according to the centroid configuration of the selected group comprises:
determining, by the processing resource, that a configuration of a first network entity in the selected group deviates from the centroid configuration of the selected group; and
sending, by the processing resource, instructions to change the configuration of the first network entity to match the centroid configuration of the selected group.

2. The method of claim 1, wherein sending the instructions to configure the network according to the centroid configuration of the selected group comprises:
determining, by the processing resource, that a new network entity is not in any of the groups, wherein the new network entity is configured on one or more of the network devices;
determining, by the processing resource, that a configuration of the new network entity most closely matches the centroid configuration of the selected group among the groups; and
adding, by the processing resource, the new network entity to the selected group.

3. The method of claim 1, wherein sending the instructions to configure the network according to the centroid configuration of the selected group comprises:
determining, by the processing resource, that a new network device is connected to the network;
determining, by the processing resource, that a new network entity is not in any of the groups, wherein the new network entity is configured on the new network device;
determining, by the processing resource, that a configuration of the new network entity most closely matches the centroid configuration of the selected group among the groups; and
adding, by the processing resource, the new network entity to the selected group.

4. The method of claim 1, wherein grouping the network entities into the plurality of groups comprises:
determining, by the processing resource, a plurality of configurations of each of the network entities;
computing, by the processing resource for each of the configurations, a matrix of individual metrics;
computing, by the processing resource for each of the configurations, a weighted matrix of individual metrics by applying a weight to the matrix of individual metrics;
computing, by the processing resource, a matrix of combined metrics by combining each of the weighted matrices of individual metrics into a single matrix; and
grouping, by the processing resource, the network entities into the plurality of groups by performing clustering on the matrix of combined metrics.

5. The method of claim 4, wherein determining the plurality of configurations of each of the network entities comprises:
parsing, by the processing resource, configuration data of the network entities into a platform agnostic model; and
determining, by the processing resource, the plurality of configurations of each of the network entities from the platform agnostic model.

6. The method of claim 1, wherein grouping the network entities into the plurality of groups comprises:
determining, by the processing resource, an ordered set of regular expressions, wherein each of the regular expressions corresponds to a target group among a plurality of target groups;
assigning, by the processing resource to each of the network entities, a highest ordered regular expression in the ordered set that matches a configuration of the network entity; and
grouping, by the processing resource, each of the network entities into the target group that corresponds to the highest ordered regular expression assigned to the network entity.

7. The method of claim 6, wherein sending the instructions to configure the network according to the centroid configuration of the selected group comprising:
determining, by the processing resource, that a new network entity is not in any of the groups, wherein the new network entity is configurable by one or more of the network devices;
assigning, by the processing resource to the new network entity, a highest ordered regular expression in the ordered set that matches a configuration of the new network entity;
determining, by the processing resource, that the selected group corresponds to the highest ordered regular expression assigned to the new network entity; and
adding, by the processing resource, the new network entity to the selected group.

8. The method of claim 6, wherein sending the instructions to configure the network according to the centroid configuration of the selected group comprises:
determining, by the processing resource, that a new network device is connected to the network;
determining, by the processing resource, that a new network entity is not in any of the groups, wherein the new network entity is configurable by the new network device;
assigning, by the processing resource to the new network entity, a highest ordered regular expression in the ordered set that matches a configuration of the network entity;
determining, by the processing resource, that the selected group corresponds to the highest ordered regular expression assigned to the new network entity; and
adding, by the processing resource, the new network entity to the selected group.

9. The method of claim 1, wherein classifying the network entities into the classification comprises:
determining, by the processing resource, a device neighbor information of each of the network entities;
based on a determination that the device neighbor information of each of the network entities corresponds to known infrastructure devices, assigning, by the processing resource, an infrastructure classification as the classification; and
based on a determination that the device neighbor information of each of the network entities does not correspond to known infrastructure devices, assigning, by the processing resource, an edge classification as the classification.

10. The method of claim 1, wherein the centroid configuration of each of the groups is a configuration of one of the network entities of the group that has a least cumulative difference with configurations of every other one of the network entities of the group.

11. The method of claim 1, wherein the network entities comprise ports, link aggregation groups (LAGs), access control lists (ACLs), or virtual local area networks (VLANs), policies, tunnels, routing protocols, or virtual routers.

12. A network orchestrator, comprising:
a processing resource; and
a machine-readable storage medium comprising instructions executable by the processing resource to:
classify a plurality of network entities into a classification, wherein the network entities are configured on a plurality of network devices that are connected to a network;
based on the classification of the network entities, group the network entities into a plurality of groups;
determine, for each of the groups, a centroid configuration of the network entities in the group;
determine that a configuration of a first network entity in a selected one of the groups deviates from the centroid configuration of the selected group; and
send instructions to change the configuration of the first network entity to match the centroid configuration of the selected group, wherein the first network entity is configured to match the centroid configuration of the selected group in response to receiving the instructions.

13. The network orchestrator of claim 12, wherein the instructions to group the network entities into the plurality of groups comprise instructions to:
determine a plurality of configurations of each of the network entities;
compute, for each of the configurations, a matrix of individual metrics, wherein each of the individual metrics is a difference between the configuration of two of the network entities;
compute, for each of the configurations, a weighted matrix of individual metrics by applying a weight to the matrix of individual metrics;
compute a matrix of combined metrics by combining each of the weighted matrices of individual metrics into a single matrix; and
group the network entities into the plurality of groups by performing clustering on the matrix of combined metrics.

14. The network orchestrator of claim 12, wherein the instructions to group the network entities into the plurality of groups comprise instructions to:
determine an ordered set of regular expressions, wherein each of the regular expressions corresponds to a target group among a plurality of target groups;
assign, to each of the network entities, a highest ordered regular expression in the ordered set that matches a configuration of the network entity; and
group each of the network entities into the target group which corresponds to the highest ordered regular expression assigned to the network entity.

15. An article comprising at least one non-transitory machine-readable storage medium comprising instructions executable by at least one processing resource to:
classify a plurality of network entities into a classification, wherein the network entities are configured on a plurality of network devices that are connected to a network;
based on the classification of the network entities, group the network entities into a plurality of groups;
determine, for each of the groups, a centroid configuration of the network entities in the group;
determine that a configuration of a first network entity in a selected one of the groups deviates from the centroid configuration of the selected group; and
send instructions to change the configuration of the first network entity to match the centroid configuration of the selected group, wherein the first network entity is configured to match the centroid configuration of the selected group in response to receiving the instructions.

16. The article of claim 15, wherein the instructions to group the network entities into the plurality of groups comprise instructions to:
determine a plurality of configurations of each of the network entities;
compute, for each of the configurations, a matrix of individual metrics, wherein each of the individual metrics is a difference between the configuration of two of the network entities;
compute, for each of the configurations, a weighted matrix of individual metrics by applying a weight to the matrix of individual metrics;
compute a matrix of combined metrics by combining each of the weighted matrices of individual metrics into a single matrix; and
group the network entities into the plurality of groups by performing clustering on the matrix of combined metrics.

17. The article of claim 15, wherein the instructions to group the network entities into the plurality of groups comprise instructions to:
determine an ordered set of regular expressions, wherein each of the regular expressions corresponds to a target group among a plurality of target groups;
assign, to each of the network entities, a highest ordered regular expression in the ordered set that matches a configuration of the network entity; and
group each of the network entities into the target group which corresponds to the highest ordered regular expression assigned to the network entity.

18. The network orchestrator of claim 12, wherein the instructions to classify the network entities into the classification comprises instructions to:
determine a device neighbor information of each of the network entities;
based on a determination that the device neighbor information of each of the network entities corresponds to known infrastructure devices, assign an infrastructure classification as the classification; and
based on a determination that the device neighbor information of each of the network entities does not correspond to known infrastructure devices, assign an edge classification as the classification.

19. The article of claim 15, wherein the instructions to classify the network entities into the classification comprises instructions to:
determine a device neighbor information of each of the network entities;
based on a determination that the device neighbor information of each of the network entities corresponds to known infrastructure devices, assign an infrastructure classification as the classification; and
based on a determination that the device neighbor information of each of the network entities does not correspond to known infrastructure devices, assign an edge classification as the classification.

* * * * *